(12) United States Patent
Louie et al.

(10) Patent No.: US 11,868,595 B2
(45) Date of Patent: Jan. 9, 2024

(54) INTELLIGENT USER INTERFACE CUSTOMIZATION FOR ONE-HANDED USE

(71) Applicant: ROKU, INC., San Jose, CA (US)

(72) Inventors: David Louie, San Jose, CA (US); Karina Levitian, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/345,708

(22) Filed: Jun. 11, 2021

(65) Prior Publication Data

US 2022/0398006 A1 Dec. 15, 2022

(51) Int. Cl.
*G06F 3/0482* (2013.01)
*G06F 3/04845* (2022.01)
*G06F 11/34* (2006.01)
*G06F 3/04883* (2022.01)
*H04L 67/50* (2022.01)

(52) U.S. Cl.
CPC ........ *G06F 3/04845* (2013.01); *G06F 3/0482* (2013.01); *G06F 3/04883* (2013.01); *G06F 11/3438* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 2009/0172562 A1* | 7/2009 | Lai | ...................... | G06F 3/04817 715/745 |
| 2011/0138416 A1* | 6/2011 | Kang | ................. | H04N 21/4821 725/39 |
| 2013/0081081 A1* | 3/2013 | Wang | ................ | H04N 21/25891 725/38 |
| 2014/0009394 A1* | 1/2014 | Lee | ....................... | H04N 5/2624 345/157 |
| 2015/0234581 A1* | 8/2015 | Terrero | ................ | G06F 3/04886 715/863 |
| 2015/0326903 A1* | 11/2015 | Reibman | ......... | H04N 21/234372 725/116 |
| 2018/0275859 A1* | 9/2018 | Hodge | .................... | A61B 5/681 |
| 2019/0324610 A1* | 10/2019 | Green | ................. | H04N 21/4312 |
| 2020/0034026 A1* | 1/2020 | Han | ...................... | G06F 3/04845 |

* cited by examiner

*Primary Examiner* — Rinna Yi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments for intelligently customizing a user interface on a remote control. In a non-limiting embodiment, a method operates by receiving a user input associated with customizing the user interface for one-hand use when the user interface is in a first configuration. The user interface may a user interface element and the first configuration includes a first dimension of the user interface. In an embodiment, the user input is a touch-based gesture received on a touchscreen of the remote control. A user may be identified responsive to receiving the user input and the user interface may be customized from the first configuration to a second configuration based on an interface customization parameter. In an embodiment, the customizing includes reducing the first dimension of the user interface to a second dimension to allow for one-hand use by the user.

15 Claims, 17 Drawing Sheets

US 11,868,595 B2

INTELLIGENT USER INTERFACE CUSTOMIZATION FOR ONE-HANDED USE

BACKGROUND

FIELD

This disclosure is generally directed to intelligently customizing a user interface for a user of a mobile device, such as a remote control, and more particularly to creating a customized interface with a configuration and layout that can be utilized for one-handed use.

BACKGROUND

For many users, the size of current mobile devices, such as smartphones, requires the use of two hands to be able to access all areas of the screen, and by extension, the user interface. To alleviate this issue, a one-handed feature mode is typically installed into mobile device software that reduces or scales down the user interface displayed on the screen to a predetermined size so that the user may use a single hand to access all elements of the user interface. Another solution shifts the user interface downward so that an upper portion of the interface can be more easily accessed without the user having to regrip their phone.

There are a number of limitations to these approaches. For instance, the reduced predetermined size or the amount that the user interface is shifts is typically set by the software and does not take into account the particular characteristics of the user and of the device that provides the user interface. Another limitation is that the reduced user interface is merely a scaled down version or shifted version of the user interface without any modifications to the user interface elements (e.g., buttons, direction pad).

SUMMARY

Provided herein are system, apparatus, article of manufacture, method and/or computer program product embodiments, and/or combinations and sub-combinations thereof, for intelligently customizing a user interface for a particular user of the mobile device. The customized user interface described in the example embodiments below may be utilized for one-handed usage and may provide an improvement over the static and predetermined sizing of conventional one-handed interfaces that fail to account for the particular users—their biometrics and their usage of the user interface—and other relevant user interface information such as user settings, crowdsource information, and physical dimensions of different mobile devices.

Users have different hand sizes, different finger lengths, and different ways of interacting with a user interface (e.g., certain buttons may be utilized more than others, certain media streaming applications may be more preferred than others). Coupled with the number of different physical dimensions of various mobile devices, a one-size-fits-all user interface for one-hand use is not ideal and can result in user frustration while interacting with the reduced user interface. Therefore, what is needed is an intelligent customization of a user interface that is tailored for each user where the customization may include a customized resizing of the dimensions and/or layout of the user interface.

An example embodiment is directed to remote control, apparatus, article of manufacture, method and/or computer program product embodiments, and/or combination and sub-combinations thereof, for generating customized user interfaces for one-hand use based on information associated with the user. In a non-limiting embodiment, an apparatus, such as a remote control, may receive a user input associated with customizing the user interface when the user interface is in a first configuration and the user interface including a user interface element. The first configuration may include a first dimension of the user interface and the user input may be a touch-based gesture received on a touchscreen of the remote control. A user may then be identified responsive to receiving the user input. An interface customization parameter may then be identified based on the user input and identifying the user. The interface customization parameter provides information for customizing the user interface and may be calculated based on a biometric data associated with the user. The user interface may be customized from the first configuration to a second configuration based on the interface customization parameter. The second configuration may define a second dimension of the user interface where the second dimension of the user interface is reduced in proportion to the first configuration to provide one-hand use of the user interface.

An additional embodiment is directed to using different information in addition to user biometric information to generate the interface customization parameter. Other examples of information that may be used include additional user information, crowdsource information, and remote control information.

An additional embodiment is directed to generating multiple interface customization parameters for a user where each interface customization parameter may specify different customizations of the user interface. Different customizations may include different positioning of user interface elements and different user interface elements to be displayed on the customized user interface.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for intelligently customizing a user interface for a particular user of the mobile device including a resizing and reconfiguration of the user interface for one-handed use. Prior art solutions rely on static changes to the user interface that rely on a predefined sizing or change to the interface. This one-size-fits-all approach fails to account for the variety of possible hand sizes and also does not take full advantage of a user-tailored customization of the interface. Embodiments described herein provide a user interface that is customized for a particular user that not only includes a resizing of the interface but also changes to the user interface elements that provide more functionality at the user's fingertips.

Figure 1:
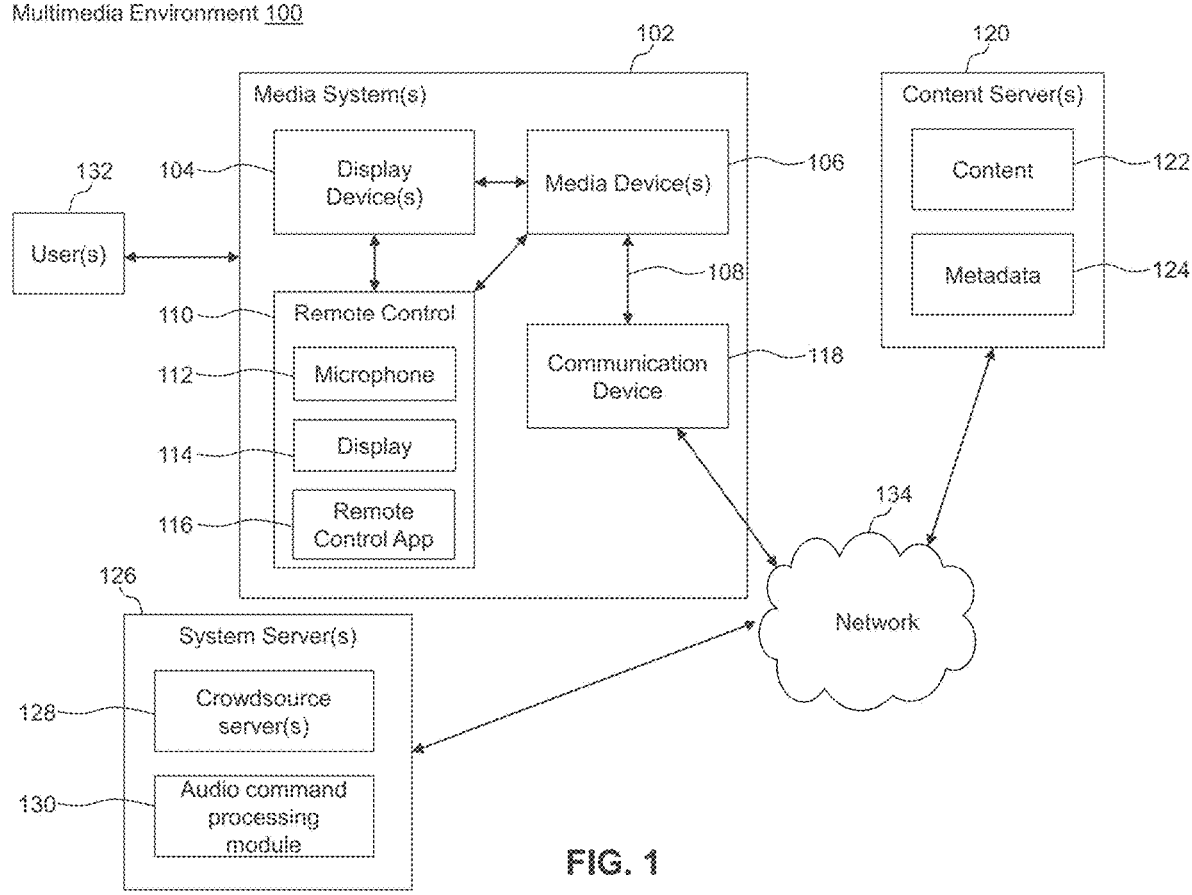
FIG. 1 illustrates a block diagram of a multimedia environment, according to some embodiments.

Various embodiments of this disclosure may be implemented using and/or may be part of a multimedia environment 100 shown in FIG. 1, in some embodiments. It is noted, however, that multimedia environment 100 is provided solely for illustrative purposes, and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Multimedia Environment

FIG. 1 illustrates a block diagram of a multimedia environment 100, according to some embodiments. In a non-limiting example, multimedia environment 100 may be directed to streaming media. However, this disclosure is applicable to any type of media (instead of or in addition to streaming media), as well as any mechanism, means, protocol, method and/or process for distributing media.

The multimedia environment 100 may include one or more media systems 102. A media system 102 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 102 to select and consume content. For example, user(s) 132 may interact with remote control 110 via a graphical user interface to select content for streaming.

Each media system 102 may include one or more media devices 106 each coupled to one or more display devices 104. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 104 may be a monitor, television (TV), computer, smart phone, tablet, wearable (such as a watch or glasses), appliance, interne of things (IoT) device, and/or projector, to name just a few examples. In some embodiments, media device 106 can be a part of, integrated with, operatively coupled to, and/or connected to display device 104.

Each media device 106 may be configured to communicate with network 134 via a communication device 118. The communication device 118 may include, for example, a cable modem or satellite TV transceiver. The media device 106 may communicate with the communication device 118 over a link 108, wherein the link 108 may include wireless (such as WiFi) and/or wired connections.

In various embodiments, the network 134 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 102 may include a remote control 110. The remote control 110 can be any component, part, apparatus and/or method for controlling the media device 106 and/or display device 104, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 104 using cellular, Bluetooth, infrared, etc., or any combination thereof. The remote control 110 may include a microphone 112, which is further described below. The remote control 110 may further include a display 114 for displaying a user interface that provides selectable user interface elements for a user to control or otherwise interact with media device 106 and/or display device 104. The user interface may, for example, enable user selection of content to be provided by media device 106. In an embodiment, the user interface is provided by the remote control application 116 installed in remote control 110. The dimensions of display 114 may vary depending on the type of remote control 110. For example, a first user may utilize a first type of mobile device for a remote control 110 and a second user may utilize a second type of mobile device for a remote control 110 (e.g., via the remote control application 116 installed on both devices). The first type and the second type may have different physical dimensions.

The remote control application 116 may be installed on remote control 110 and may be configured to display a user interface for accessing content via media device(s) 106 and/or display device 104. The user interface may include user interface elements such as buttons, sliders, images, icons, windows, and the like for allowing user(s) 132 to view, select, and otherwise identify content to be streamed by media device(s) 106 to display device 104. The user interface may include a predefined dimension (e.g., to fit the size of display 114) and a predefined configuration that implements particular user interface elements at specific positions in the user interface. The predefined dimension and configuration may be a standard display of the user interface for all users. For example, the predefined configuration may implement a particular layout for a direction pad, volume controls, and other user interface elements for interacting with media content. The application may further include means for implementing an interface customization parameter that modifies the predefined dimension and/or the predefined configuration by, for example, either reducing the dimension to a smaller size or modifying the layout so that different user interface elements are displayed at different positions of the user interface.

In an embodiment, the remote control application 116 may also include means for monitoring how user(s) 132 interact with the user interface. For example, the remote control application 116 may track how often user(s) 132 select certain user interface elements and store this information in memory. In an embodiment, this usage information may be implemented as a ranked list identifying how often certain interface elements are used by user(s) 132. For example, the usage information may indicate that user(s) 132 utilizes the volume buttons—volume up, volume down, mute—more than other interface elements. The application may transmit the usage information to crowdsource server(s) 128.

User interface elements such as buttons may allow users to control playback of media content and provide access to other tools such as user settings, network settings. Another example of a user interface element is a slider which may provide more granular control such as playback (e.g., rewind or fast forward) or settings (e.g., adjusting volume, brightness, etc.)

The multimedia environment 100 may include a plurality of content servers 120 (also called content providers). Although only one content server 120 is shown in FIG. 1, in practice the multimedia environment 100 may include any number of content servers 120. Each content server 120 may be configured to communicate with network 134.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, apps, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 100 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different user(s) 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

As another example, crowdsource server(s) 128 may further receive and store user interface information such as how user(s) 132 interact with the user interface provided through their respective remote control 110 including the usage information described above (e.g., how often buttons are used). Crowdsource server(s) 128 may generate crowdsourced user interface information that may identify interaction history of the user interface for all remote controls that are connected to crowdsource server(s) 128. The crowdsourced user interface information may be implemented as a ranked list identifying user interface elements of the user interface that are most used by the users across multiple multimedia environments.

Crowdsource server(s) 128 may store organize this usage information into user categories. For example, the usage information may be categorized by gender, by location, by user biometric information (e.g., hand size, finger length), just to name a few examples. In this manner, crowdsource server(2) 128 may identify usage information that is most relevant to a particular user based on their categorization.

The system servers 126 may also include an audio command processing module 130. As noted above, the remote control 110 may include a microphone 112. The microphone 112 may receive audio data from user(s) 132 (as well as other sources, such as the display device 104). In some embodiments, the media device 106 may be audio responsive, and the audio data may represent verbal commands from the user(s) 132 to control the media device 106 as well as other components in the media system 102, such as the display device 104. Audio received via the microphone 112 may be stored in a memory of the remote control 110.

In some embodiments, audio command processing module 130 may be configured to identify a gender of the user based on received audio data. In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize a verbal command from user(s) 132. The audio command processing module 130 may then forward the verbal command back to the media device 106 for processing.

Figure 2:
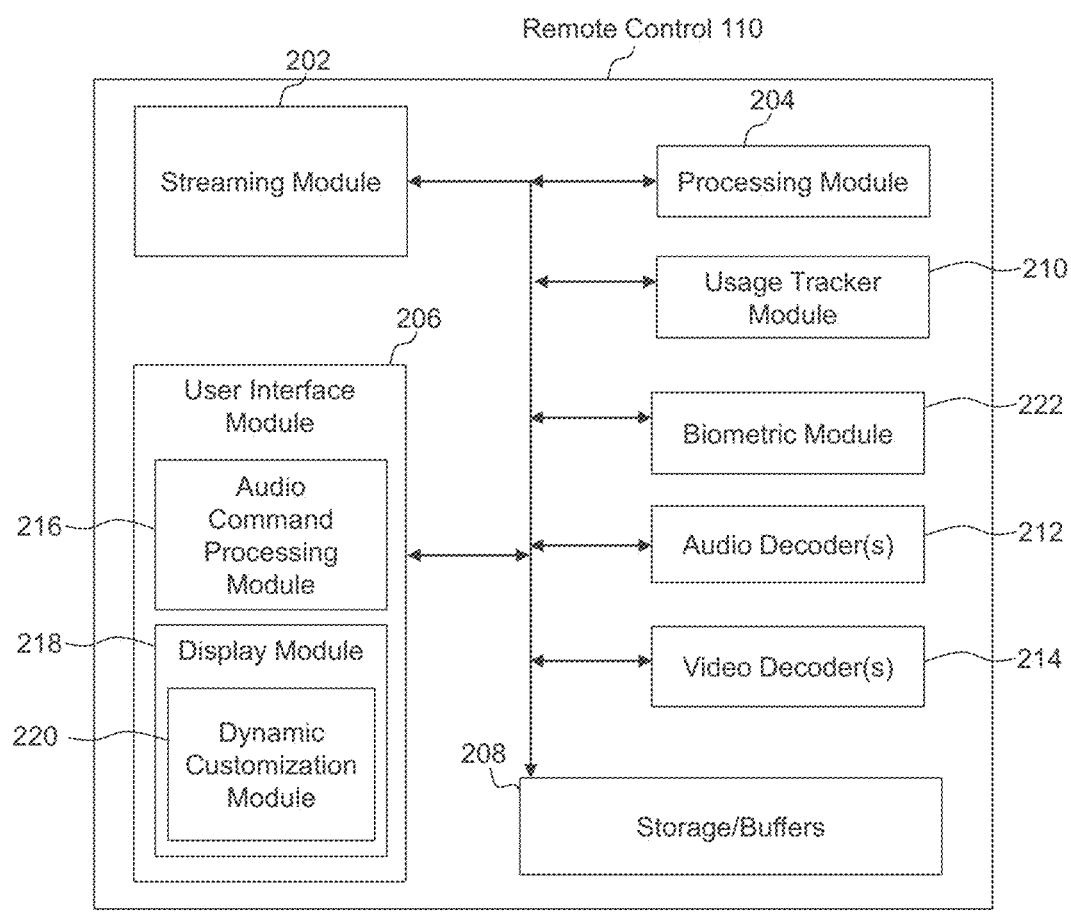
FIG. 2 illustrates a block diagram of a remote control, according to some embodiments.

In some embodiments, the audio data may be alternatively or additionally processed and analyzed by an audio command processing module 216 in the media device 106 or in remote control 110 in embodiments where remote control 110 is implemented as a mobile device with an installed remote control application (see FIG. 2). The media device 106 and/or remote control 110 and the system servers 126 may then cooperate to pick one of the verbal commands to process (either the verbal command recognized by the audio command processing module 130 in the system servers 126, or the verbal command recognized by the audio command processing module 216 in the media device 106 and/or remote control 110).

FIG. 2 illustrates a block diagram of an example remote control 110, according to some embodiments. Remote control 110 may be any device that includes a screen that can be configured to display user interfaces associated with a remote control application such as, for example, a laptop, remote control, mobile phone, tablet, watch or other wearable device.

Remote control 110 may include a streaming module 202, processing module 204, storage/buffers 208, and user interface module 206. As described above, the user interface module 206 may include the audio command processing module 216 and display module 218. The display module 218 may further include a dynamic customization module 220. The display module 218 may be configured to display different content including media content received from the media device 106 via streaming module 202 and a user interface for allowing users to provide user input for controlling media device 106 and display device 104. The dynamic customization module 220 may be configured to customize the user interface based on one or more factors such as the user's biometric information, user's interaction history, and crowdsourced user interface information. In an embodiment, customizing the user interface includes scaling the user interface to a size that is suitable for one-handed use by the user.

The remote control application 116 may be installed in storage/buffer 208 of remote control 110. The user interface provided by the remote control application 116 may enable remote control capabilities to remote control 110. The remote control application 116 may be configured to interact with media device 106. In an embodiment, the remote control 110 may only communicate with media device 106 if the remote control application 116 is installed on remote control 110. For example, remote control 110 may be a mobile phone and the remote control application 116 is an application provided by a manufacturer of media device 106 and that is downloaded and installed on the mobile phone. Without the remote control application 116, the mobile phone may not otherwise be able to communicate with the media device 106.

As part of communicating with the media device 106, the remote control application 116 may be used to interact with media streaming applications that are installed on media device 106. For example, remote control application 116 may enable a user to select between different streaming services installed on media device 106. The remote control application 116 may track which streaming services are most selected as well as the interactions with the user interface that the user has with these other streaming services.

The remote control 110 may also include usage tracker module 210, one or more audio decoders 212, one or more video decoders 214, and biometric module 222.

Usage tracker module 210 may be configured to receive and process user interactions with a user interface displayed by the remote control application 116 or other user interfaces displayed by remote control 110. In an embodiment, the remote control application 116 may be configured to track and monitor the user interactions and provide the tracked user interactions to usage tracker module 210 for storage and further processing. For example, usage tracker module 210 may process the interactions when a user interface is displayed by remote control 110. In an embodiment, usage tracker module 210 may monitor and store user interactions with different user interfaces provided by different remote control applications installed on remote control 110. Types of user interactions include, for example, the frequency a user selects a button (e.g, volume up, volume down, direction pad), which media content a user selects, and frequency that media streaming applications are selected by the user using remote control 110.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Biometric module 222 may be configured to receive and securely store biometric information associated with users using the remote control 110. Biometric information may include any information associated with the user detected by different sensors of remote control 110. These sensors include the touchscreen of remote control 110, audio command processing module 216, a camera (not shown), and a finger print sensor (not shown). For example, this information could include a detected finger position on the touchscreen of remote control 110 and a detected finger size based on the finger press on the touchscreen of remote control 110. The detected finger position may be used to determine, for example, the hand size of the user and the finger length of the finger used by the user to make selections on the touchscreen. Other biometric information may include other information associated with a user such as the user's voice (detected by audio command processing module 216) and facial characteristics (detected by a camera of the remote control 110) both of which may be used to determine a user's gender, either singularly or in combination with other biometric information.

Now referring to both FIGS. 1 and 2, in some embodiments, the user(s) 132 may interact with the media device 106 via the remote control 110. For example, the user(s) 132 may use the user interface provided by the remote control application 116 to interact with the media device 106 to select media content, such as a movie, TV show, music, book, application, game, etc. The media device 106 may request the selected content from the content server(s) 120 over the network 134. The content server(s) 120 may transmit the requested content to the media device 106 which may then transmit the received content to the display device 104 for playback to the user(s) 132.

In mirroring embodiments, the streaming module 202 may receive the content from the media device 106 or display device 104 in real time or near real time as those devices receive such content from the content server(s) 120. The remote control application 116 may provide a separate display window for displaying mirrored content. In non-mirroring embodiments, the streaming module 202 may communicate with the media device 106 or display device 106 in the background to retrieve other settings or screens to display on the user interface. For example, media streaming applications installed on the media device 106 may provide certain screens for selecting settings such as selecting a user profile or media content. In a non-mirroring embodiment, while the media device 106 or display device 106 are streaming media content, the streaming module 202 may retrieve these screens for display by the remote control application 116 via, for example, a display window. In this manner, a user may change settings such as changing profiles or selecting different media content using the remote control application 116 while media content is streamed via the media device 106.

In some embodiments, the user(s) 132 may provide a user input via the user interface. The user input may be recognized by dynamic customization module 220 as a request to customize the user interface for the user such as by scaling the user interface for one-handed use. Examples of user inputs include a touch-based gesture via a touchscreen of the remote control 110 or selection of a button provided via the user interface. Upon recognizing the user input as a request to customize the user interface, dynamic customization module 220 may retrieve an interface customization parameter from storage/buffers 208. The interface customization parameter may be generated based on one or more of: biometric information from biometric module 222, interaction history information from usage tracker module 210, crowdsourced user interface information from crowdsource server 128 or from storage/buffer 208 if the crowdsourced user interface information was previously transmitted to the remote control 110, and/or physical dimensions of the remote control 110. Dynamic customization module 220 may then customize the user interface based on the interface customization parameter.

The interface customization parameter may include a scaling factor (e.g., a percentage) that reflects an amount to reduce or scale the user interface from a first configuration to a second configuration. The first configuration may represent the original size and layout of the user interface and the second configuration may represent a scaled version of the first configuration where the amount that the second configuration is scaled is based on the customization parameter. In another embodiment, the interface customization parameter may specify specific values for a height and width for the second configuration. The specific values may be calculated based on the scaling factor.

The interface customization parameter may further include indications of how to configure buttons for the second configuration. For example, the interface customization parameter may be based on the interaction history of the user using remote control 110 and/or crowdsourced user interface history of how other users interacted with their respective controls. Examples of information stored in the interaction history included a ranked list of buttons based on, for example, the frequency that buttons are selected by the user. The information may be stored at additional levels of granularity. For example, the interaction history may organize user actions (e.g., buttons selected, content selected) by time of day, by which display device the remote control 110 is interacting with, or by which media device the remote control 110 is interacting with. For example, a user may use different buttons or perform other actions differently in the morning versus in the evening; or a user may use different buttons or perform actions differently for different display devices or different media devices that are located in the user's home (e.g., a television or media device in the user's bedroom versus a television or media device in the user's living room). As one example, a user may use the volume button more often for a television in the living room versus the television in the bedroom. As another example, the user may select family friendly content (e.g., rated G or PG) from the media device in the living room and more mature content (e.g., PG-14, R) from the media device in the television.

Examples of actions that may be performed include selecting media content, interactions with menus displayed by user interface, voice commands, or selecting other streaming applications from media device 106.

Embodiments of Dynamic UI Customization

FIGS. 3A-3I are exemplary diagrams illustrating different flows for customizing a user interface on remote control 300 triggered by a user input. Remote control 300 is an embodiment of remote control 110 and is not intended to limit remote control 110 to any one particular implementation. The user interfaces depicted in FIGS. 3A-3I are also merely exemplary and are not intended to limit the user interfaces to any particular configuration.

Figure 3A:
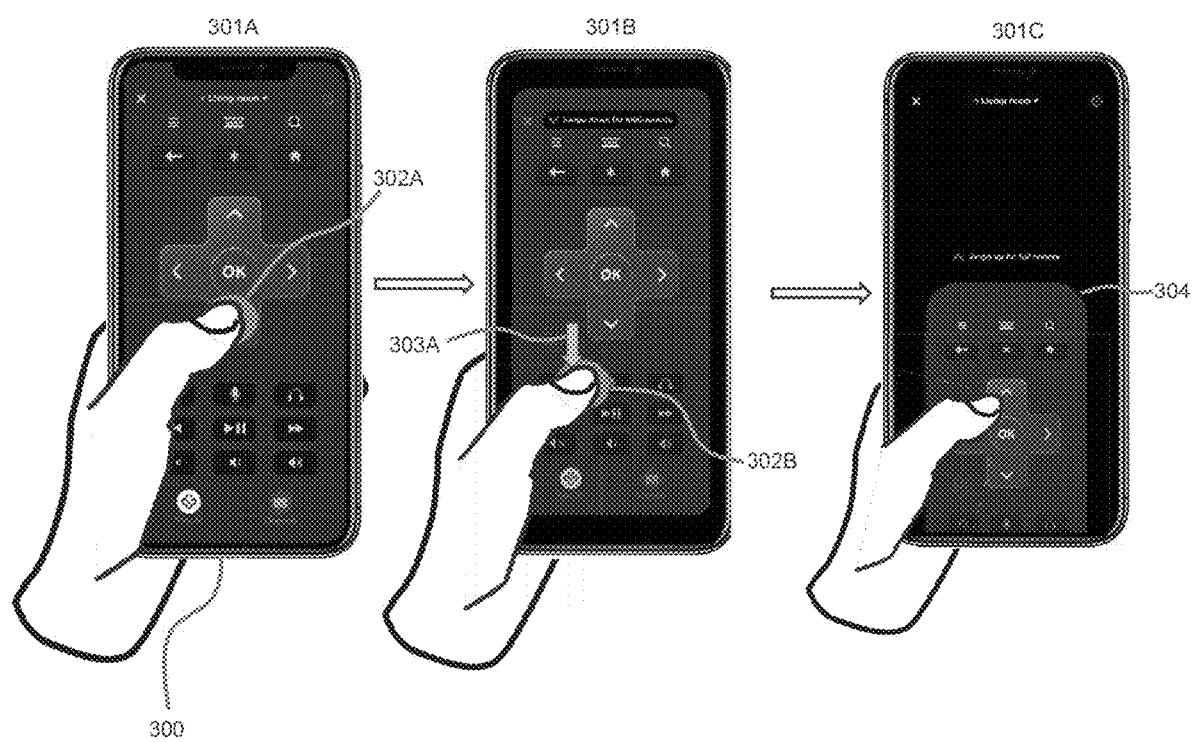
FIGS. 3A-3I illustrate exemplary diagrams illustrating different flows for customizing a user interface based on various user inputs.

FIG. 3A depicts a flow involving an exemplary user interface shown at different configurations 301A-301C on remote control 300. Initial configuration 301A may represent an initial configuration of the user interface provided by the remote control application 116. In an embodiment, initial configuration 301A may represent the default configuration for the user interface when the remote control application 116 is launched on remote control 300. The default configuration may be a configuration that is initially provided to all users by the remote control application 116. An initial touch at a first position 302A may be detected while the user interface is in the initial configuration 301A. The initial touch may represent the first part of a user input to trigger a customization of the user interface. In an embodiment, the remote control application may require the initial touch to be a long press on the touchscreen while the finger remains at the first position 302A. The long press may indicate that a request for the customization is being initiated by the user. A long press may be a press on the touchscreen for longer than a preset time period, such as two seconds. The user input is not limited to this example and other embodiments of user inputs may be configured by the user to trigger the customization.

Transition configuration 301B may present another configuration of the user interface when the remote control application determines that the user is initiating a request to customize the user interface. In an embodiment, there may be a change in the display of the user interface during the transition configuration 301B to indicate to the user that a customization is taking place. For example, the user interface in transition configuration 301B may start reducing in size as the finger begins it gesture, such as a downward motion 303A, while the finger is touching the touchscreen and ends when the finger arrives at a second position on the touchscreen after completing the downward motion 303A. The reduction in size of the user interface may include a scaling of both the vertical and horizontal dimension. Whether to scale down the vertical dimension, horizontal dimension, or both may be based on user biometric information, other user information (such as a setting selected by the user), or crowdsource information (such as which options were selected by other users with similar biometrics). For example, a first user with a larger hand (or thumb) may need less scaling of the horizontal dimension because they are capable of reaching across the width of the screen compared to a second user with a smaller hand (or thumb).

The downward motion 303A is one example of a gesture that may be recognized as a user input to trigger the customization of the user interface. In an embodiment, the remote control application 116 may initiate the customization of the user interface upon detecting that the finger has completed the gesture—in a downward motion 303A from the first position 302A to a second position 302B. In another embodiment, the remote control application 116 may initiate the customization during the gesture (e.g., as the finger does the downward motion 303A). The downward motion 303A is merely exemplary and any type of gesture that is detectable by the touchscreen may be used as the user input. For example, a sideways gesture or a diagonal gesture may be used.

Final configuration 301C may present a final configuration of the user interface after the user interface has been customized. The customized user interface 304 may represent a scaled down or reduced in proportion version of the initial configuration 301A of the interface. In an embodiment, the customized user interface 304 allows the user to use one-hand to access all displayed user interface elements. The amount that customized user interface 304 has been reduced in scale compared to the initial configuration 301A may be determined based on the interface customization parameter. As noted above, the interface customization parameter specifies information that may be used to resize the user interface from a first configuration (e.g., full screen as shown in initial configuration 301A) to a second configuration (e.g., resized as shown in final configuration 301C). In an embodiment, the size of the second configuration is determined to allow for one-hand use by a user and may be based on information about the user such as the hand size of the user.

In an embodiment, the interface customization parameter is represented by a percentage (e.g., 50%) which indicates the proportion in which the initial configuration 301A is scaled to arrive at the final configuration 301C. The interface customization parameter may also include information regarding where to display the customized user interface 304 within the touchscreen of remote control 300. In the initial configuration 301A, the user interface is displayed across the entire touchscreen. When the user interface is scaled down so that it no longer occupies the entire touchscreen, the interface customization parameter may specify where to display the customized user interface 304. In an embodiment, the information regarding where to display the customized user interface 304 may be implemented as coordinates that identify a location on the touchscreen. In another embodiment, the interface customization parameter identifies specific height and width values instead of a scaling factor. The specific height and width values may be used to customize the dimensions of the customized user interface 304.

In an embodiment, after the customized user interface 304 is displayed, the user may request returning to the original user interface in the initial configuration 301A. The user request may include any means such as another gesture on the touchscreen or touching a specific portion of the touchscreen.

Figure 3B:
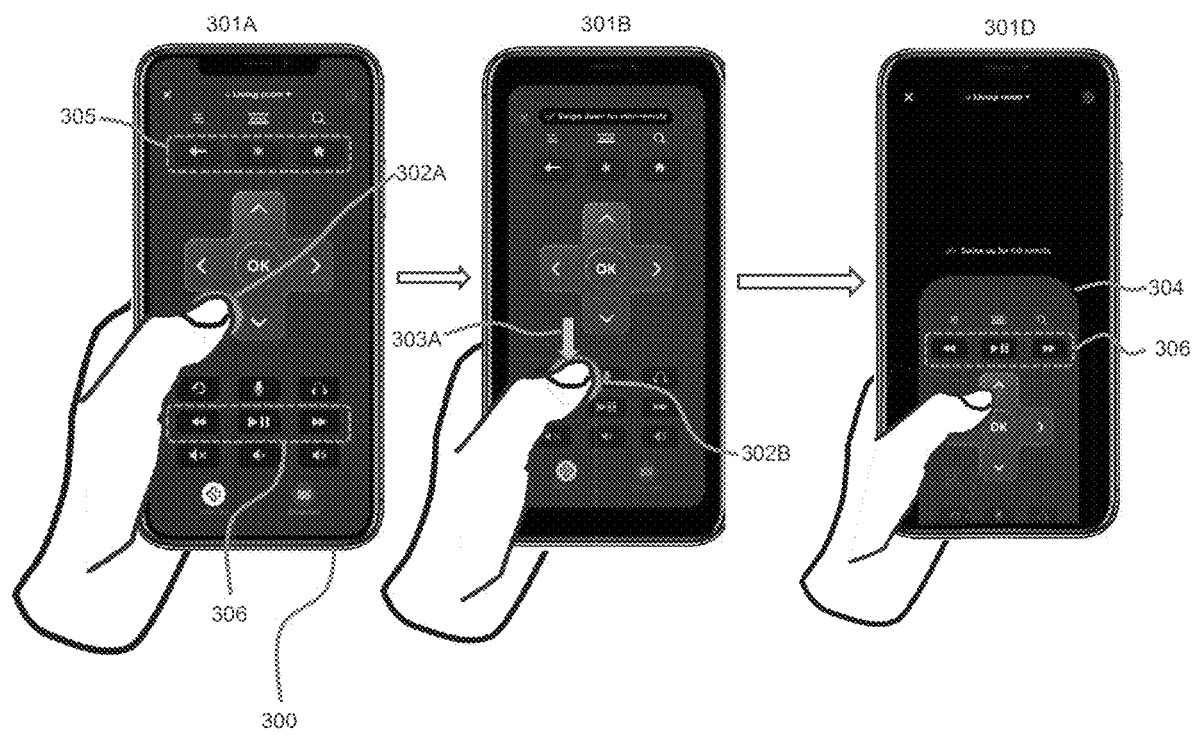

FIG. 3B depicts another flow involving an exemplary user interface shown at different configurations 301A, 301B, and 301D. In this embodiment, certain user interface elements may be modified as part of customizing the user interface to create a new layout of user interface elements. A first row of buttons 305 and a second row of buttons 306 are examples of user interface elements. The first row of buttons 305 may include a back button, an options button, and a home button. The second row of buttons 306 may include a rewind button, a play/pause button, and a fast forward button. Examples of user interface elements include a row of buttons, individual buttons, and a directional pad. In another embodiment, the interface customization parameter may further specify specific user elements to be included in customized user interface 304.

Initial configuration 301A and transition configuration 301B may be implemented in a similar manner described with respect to FIG. 3A. Initial configuration 301A may display the user interface in a first layout with the first row of buttons 305 and the second row of buttons 306. The user interface is displayed on remote control 300 and receives an initial touch at a first position 302A that may represent part of a user input to trigger customization of the user interface. The user input may continue with a gesture, such as downward motion 303A. The downward motion 303A is merely exemplary and any type of gesture that is detectable by the touchscreen may be used as the user input. Upon recognition of the user input as a trigger to customize the user interface, the remote control application may customize the user interface based on, for example, the interface customization parameter.

Final configuration 301D represents another example of a customized user interface 304 that includes a scaled version of the original user interface as well as a modification to a user interface element. Customized user interface 304 may include a modified layout to its user interface elements. In this embodiment, the second row of buttons 306 is moved and replaces the first row of buttons 305 within the user interface which allows for easier access to those buttons by the user. Modification of a user interface element may be based on the interface customization parameter which may identify user interface elements that receive higher usage by a user of remote control 300 or as indicated by crowdsourced user interface information. For example, the remote control application 116 may track which user interface elements are most selected by the user. As part of customizing the user interface, the remote control application may move those user interface elements to a position on the user interface that is more accessible to the user. In this embodiment, the interface customization parameter may have identified the second row of buttons 306 as being most selected by the user and therefore a candidate for moving to a more accessible location in the customized user interface 304.

Figure 3C:
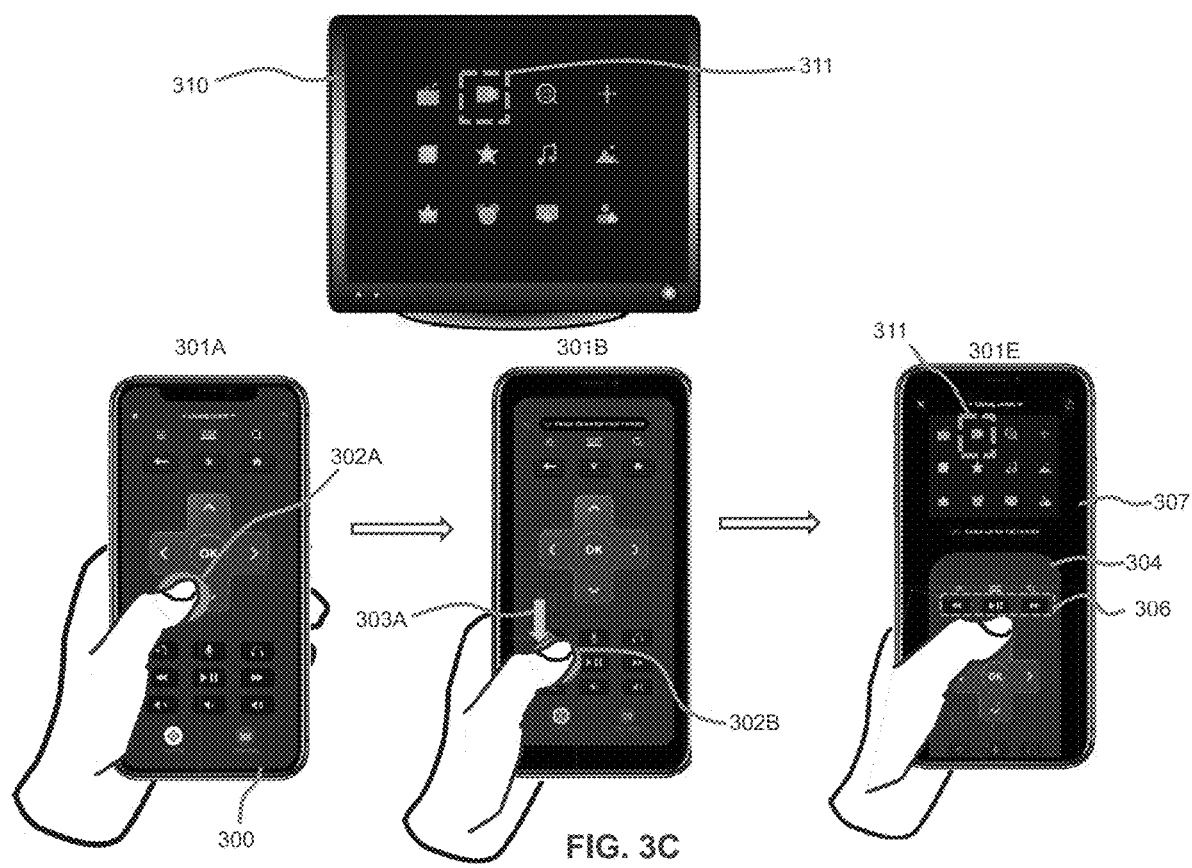

FIG. 3C depicts another flow involving an exemplary user interface shown at different configurations 301A, 301B, and 301E. In this embodiment, remote control 300 is in communication with display device 310 that is displaying a menu that includes media content represented by selectable icons on the user interface. In an embodiment, display device 310 may be in communication with a media device (e.g., media device 106) which is providing the media content for display on remote control 300. In another embodiment, the media device may be integrated directly into display device 310. Media content may be a media content selection screen but this is merely exemplary and not intended to be limiting. Other types of media content are possible including the actual media content. For example, the media content may be any combination of streaming applications, media content such as movies or television shows, and menus (e.g., for accessing settings). Initial configuration 301A and transition configuration 301B may be implemented as discussed with respect to FIG. 3A. The downward motion 303A is merely exemplary and any type of gesture that is detectable by the touchscreen may be used as the user input. Final configuration 301E may also include a customized user interface 304 with a second row of buttons 306 being shifted in position in the user interface from the initial configuration 301A. In this embodiment, final configuration 301E may further include a display window 307 for mirroring media content that is displayed on display device 310. Display window 307 may allow the user to see the media content on remote control 300 which may make it easier for the user to perform control operations on the media content. For example, the user may wish to rewind or fast forward media content using buttons in the second row of buttons 306. Being able to view the media content in display window 307 of remote control 300 may make it easier for the user to time skip to the desired portion of the media content.

In an embodiment, the display window 307 may also allow the user to select media content when it is displayed on display device 310. For example, the user may be able to touch media content icon 311 when it is displayed in the display window which would initiate selection of the media content icon 311 for streaming on display device 310. Display window 307 thus allows a user to quickly select media content without having to use the direction pad to manually scroll through the displayed media content and select the media content icon 311.

In an embodiment, the display window 307 may mirror content being displayed on display device 310. When mirroring media content between display device 310 and remote control 300 (e.g., responsive to receiving the user input to customize the user interface), the media content may be streamed to the streaming module 202 of remote control 110 from a media device (not shown) that is connected to display device 310 (e.g., integrated into display device 310 or connected externally) directly to remote control 300, and specifically, display window 307 of the remote control application. In an embodiment, the display window 307 may display other content related to the media content being displayed on display device 310. Examples include settings related to the streaming application being used to display the media content (e.g., other episodes of the same media content), other media content related to the currently displayed media content (e.g., based on the user's viewing history and/or crowdsourced user information), and other streaming applications that are available for selection to allow for faster switching.

Figure 3D:
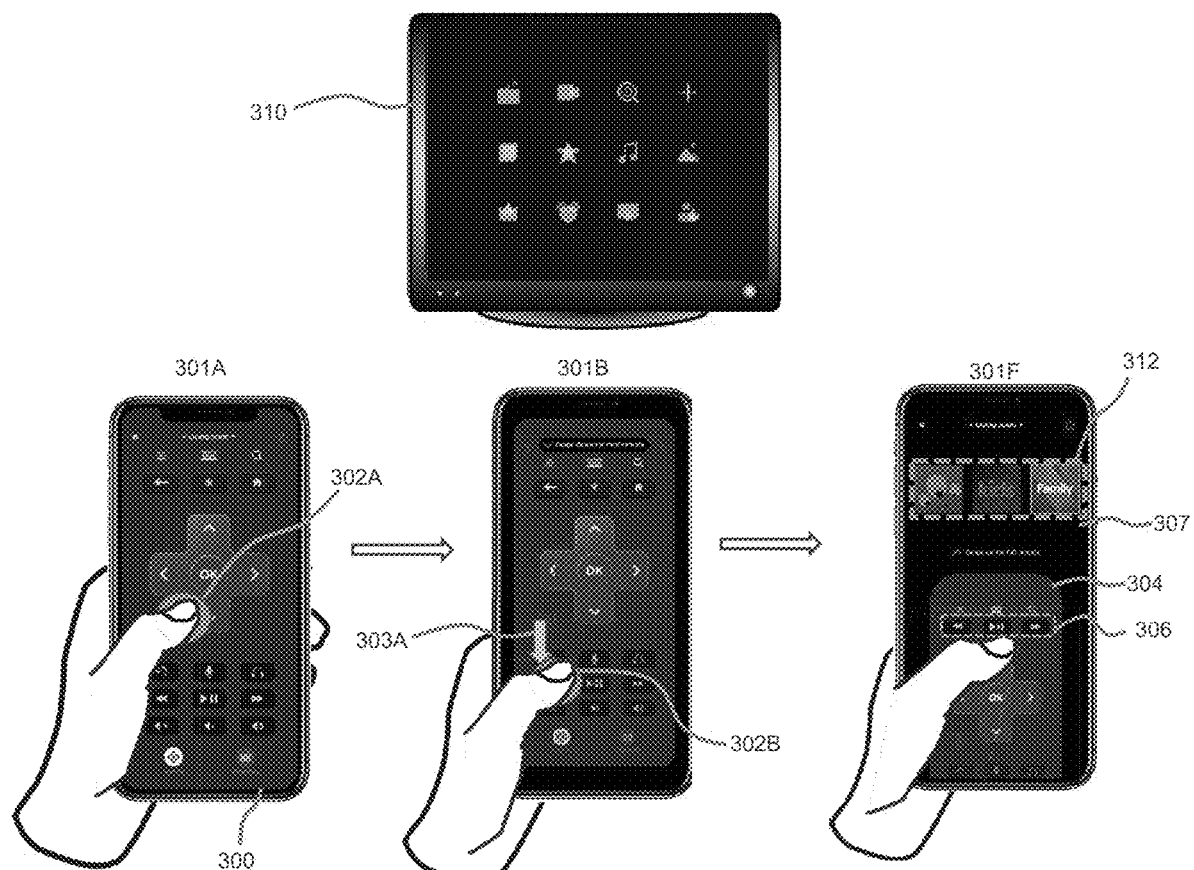

FIG. 3D describes one example of displaying other content in the display window 307. FIG. 3D depicts another flow involving an exemplary user interface shown at different configurations 301A, 301B, and 301F. Initial configuration 301A and transition configuration 301B may be implemented similarly as discussed with respect to FIG. 3A. The downward motion 303A is merely exemplary and any type of gesture that is detectable by the touchscreen may be used as the user input. In an embodiment, the media content may be any combination of streaming applications, media content such as movies or television shows, and menus (e.g., for accessing settings). In this embodiment, final configuration 301F may include a display window 307 for displaying a shortcut 312 to options or settings associated with the media content being displayed on display device 310. The options or settings that are displayed in customized user interface 304 may be based on information specified by the interface customization parameter. The remote control application 116 may track which options or settings are most utilized by the user in certain situations, such as when certain streaming applications are displayed on display device 310, and provide the shortcut 312 to those options or settings in display window 307 when displaying customized user interface 304. The user may then quickly select the appropriate option (e.g., by touch or using the direction pad in customized user interface 304) when it is displayed in display window 307. Providing the shortcut 312 allows for faster selection of desired options or settings and reduces the number of button presses that is typically utilized to select a setting. The shortcut 312 being displayed may be based on the interface customization parameter which may indicate, for example, most frequently used settings, most frequently used settings while in different media streaming applications, or a predefined user setting that was configured by the user.

In an embodiment, the options or settings are specific to each media streaming application installed on the media device 106. For example, a user may have different settings for different media streaming applications such as different profiles. The settings that are displayed in display window 307 may thus depend on the media streaming application that is being currently utilized by media device 106. In one embodiment, the interface customization parameter includes the media streaming application that is currently selected by the user as well as the settings that are specific to that media streaming application.

In another embodiment, the display window 307 may display shortcuts to other content such as other media applications, other media content available through the currently utilized media application or through other media applications installed on media device 106, and other related content.

In an embodiment, the user input may be used to trigger an action and the display window 307 may be used to display results of an action. For example, the user input may trigger a search of the media content currently displayed on display device 310 and the results of the search, such as other streaming applications, may be displayed. The user may then use the display window 307 to switch between streaming applications to access another version of the media content on the other streaming application. For example, one season of a television show may be available on one streaming application and another season available on another streaming application. The user input may be used to trigger a search the media content through the media device 106 which may then provide the other streaming application for display in display window 307.

Figure 3E:
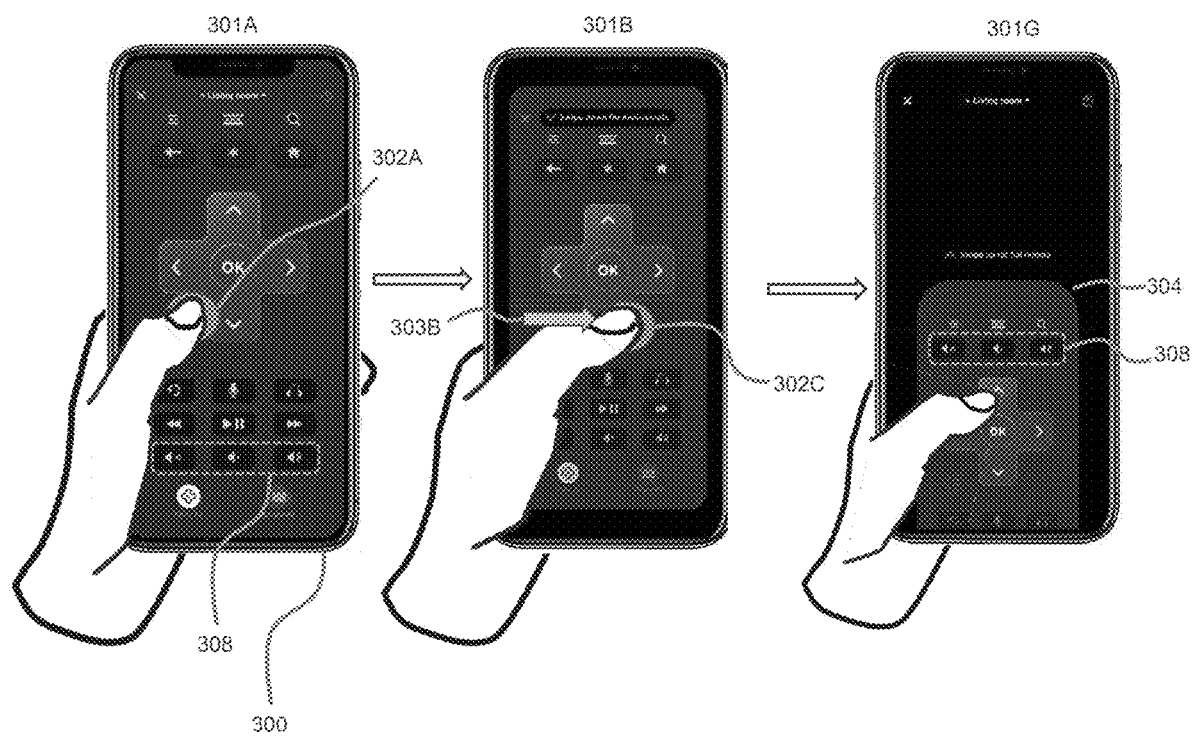

FIG. 3E depicts another flow involving an exemplary user interface shown at different configurations 301A, 301B, and 301G. In this embodiment, a different user input may be associated with a different customization of the user interface. Initial configuration 301A and transition configuration 301B may be implemented similarly as discussed with respect to FIG. 3A. In this embodiment, the user input may include an initial touch at a first position 302A, a different gesture such as a sideways motion 303B, and a touch at a second position 302C. The sideways motion 303B is merely exemplary and is described here to illustrate a gesture different from downward motion 303A. Any type of gesture that is detectable by the touchscreen may be used as the user input and different gestures may be associated with different customizations of the user interface. Upon detecting that the finger has completed the gesture, the remote control application may initiate the customization of the user interface based on a modification of a different user interface element, for example, third row of buttons 308. For example, the interface customization parameter may rank user interface elements based on how frequently they are utilized by the user. In an embodiment, the interface customization parameter indicate that the third row of buttons 308 is second in usage to second row of buttons 306. The remote control application may associate a first user input (e.g., one with a downward motion 303A) to the second row of buttons 306 and a second user input (e.g., one with a sideways motion 303B) to the third row of buttons 308.

Accordingly, upon detecting the user input with the sideways motion 303B, the remote control application may generate customized user interface 304 based on the user interface element associated with that user input. In this embodiment, that user interface element is the third row of buttons 308. Final configuration 301G may therefore display the customized user interface 304 with the third row of buttons 308 shifted in position so that it is more accessible for selection.

Figure 3F:
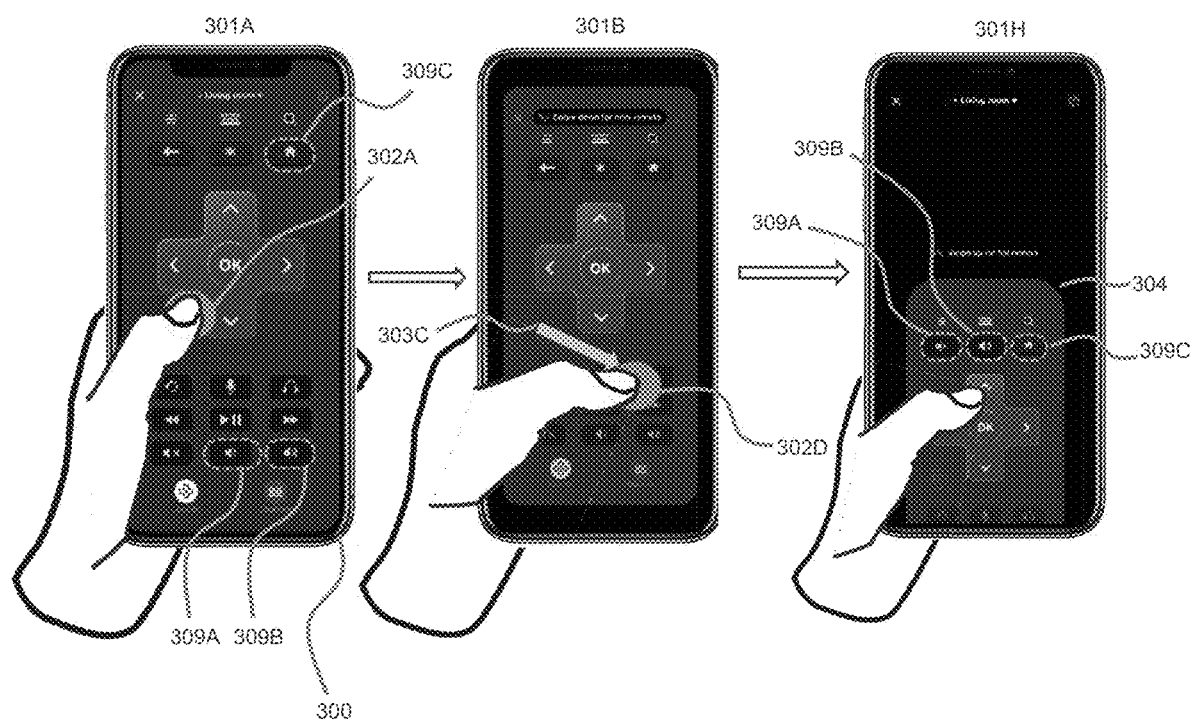

FIG. 3F depicts another flow involving an exemplary user interface shown at different configurations 301A, 301B, and 301H. In this embodiment, a different user input may be associated with a different customization of the user interface based on different user interface elements. Initial configuration 301A and transition configuration 301B may be implemented similarly as discussed with respect to FIG. 3A. In this embodiment, the user input may include an initial touch at a first position 302A, a different gesture such as a diagonal motion 303C, and a touch at a third position 302D. The diagonal motion 303C is merely exemplary and any type of gesture that is detectable by the touchscreen may be used as the user input. In this embodiment, there is a specific location on the user interface that may be designated as the location for the initial touch. Other embodiments may include a designated gesture region provided by the remote control application or a software control (e.g., button on the user interface) or hardware control (e.g., physical button press) to trigger gesture detection. The customized user interface elements may include different buttons located in the user interface such volume down button 309A, volume up button 309B, and home button 309C.

The remote control application may associate the gesture with a diagonal motion 303C to another customization of the user interface. In this embodiment, the customization may include selecting most selected buttons by the user and repositioning those buttons within the customized user interface 304. Final configuration 301H depicts customized user interface 304 with the volume down button 309A and volume up button 309B repositioned from their original positions to the more accessible location in the customized user interface 304.

Figure 3G:
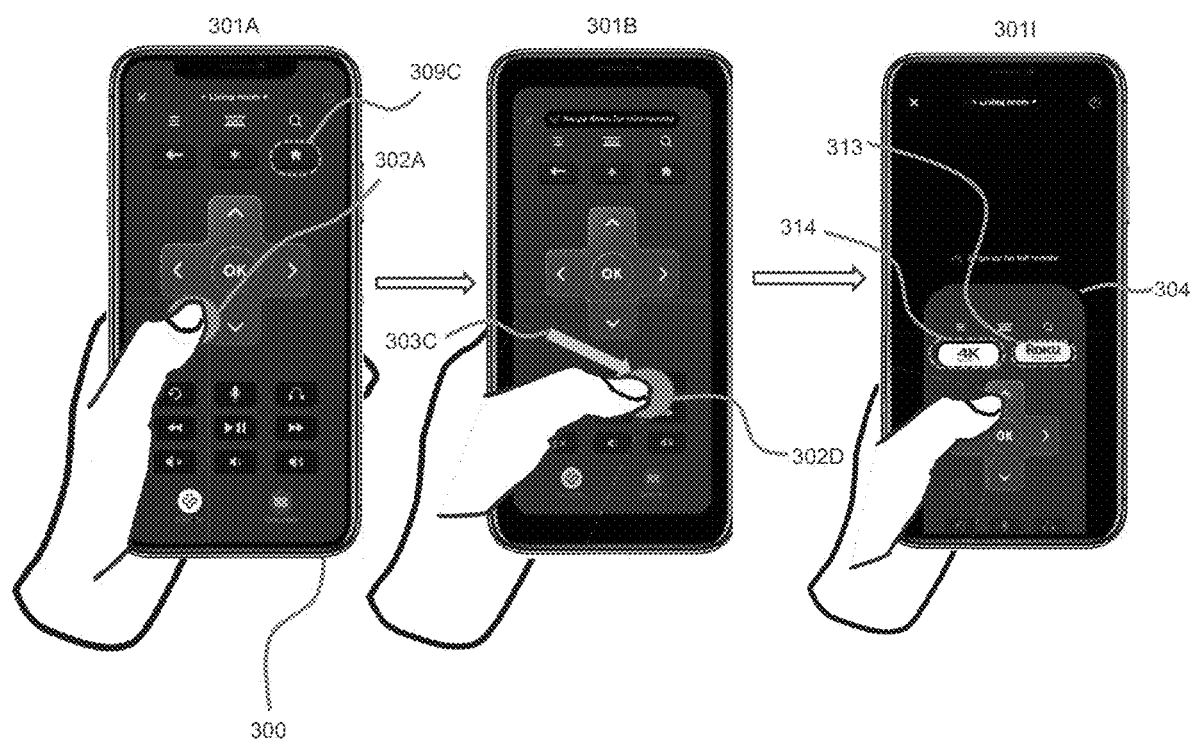

FIG. 3G depicts another flow involving an exemplary user interface shown at different configurations 301A, 301B, and 301I. Initial configuration 301A and transition configuration 301B may be implemented similarly as discussed with respect to FIG. 3F which includes a user input with a diagonal motion 303C. In this embodiment, different user interface elements which are not currently shown in the original user interface may be positioned in customized user interface 304 in response to the user input. For example, in response to detecting the user input with the diagonal motion 303C, the remote control application may identify other user interface elements to display in the customized user interface 304. As noted above, these other user interface elements may be identified via the interface customization parameter and may be based on most popular buttons, crowdsourced user interface information, or other settings set by the user or the remote control application. In this embodiment, application buttons 313 and 314 may be displayed in customized user interface 304.

Figure 3H:
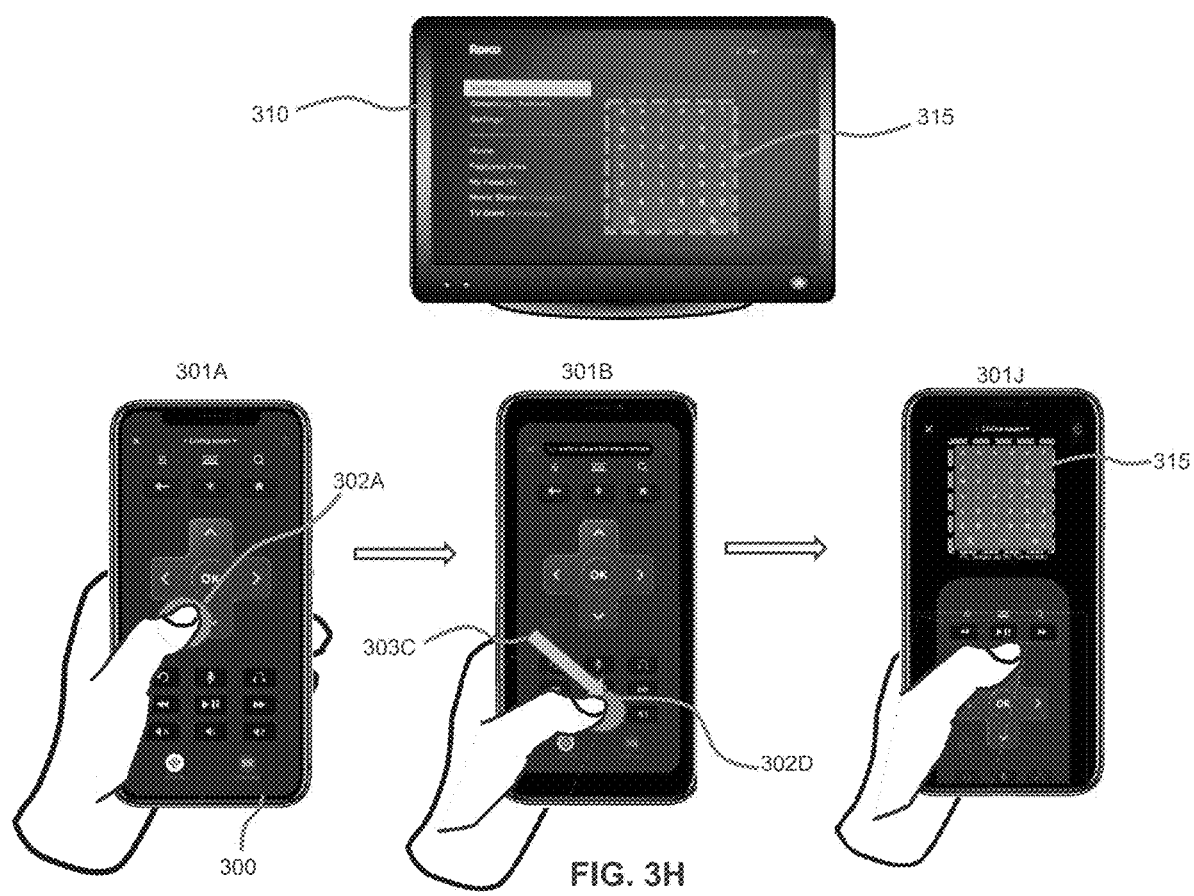

FIG. 3H depicts another flow involving an exemplary user interface shown at different configurations 301A, 301B and 301J. In this embodiment, remote control 300 is in communication with display device 310 that is displaying a menu that includes media content represented by selectable icons on the user interface. In an embodiment, the media content may be any combination of streaming applications, media content such as movies or television shows, and menus (e.g., for accessing settings). In this embodiment, media content represents a menu screen with selectable settings. Initial configuration 301A and transition configuration 301B may be implemented similarly as discussed with respect to FIG. 3F which includes a user input with a diagonal motion 303C.

Final configuration 301J may include a display window 307 for displaying a selectable portion 315 of media content that is displayed on display device 310. Display window 307 may allow the user to view the selectable portion 315 of the media content on remote control 300 which may make it easier for the user to perform control operations on the media content. For example, the user may wish to more quickly select specific icons (e.g., letters) in selectable portion 315 that is displayed on display device 310. Being able to view the selectable portion 315 of the media content in display window 307 of remote control 300 allows the user to more quickly select the icons instead of using arrows of the direction pad to navigate.

In an embodiment, the selectable portion 315 that is displayed in response to user input such as diagonal motion 303C is based on the interface customization parameter. The selectable portion 315 of media content may be determined based on the user's previous interactions, user-selectable settings, and/or crowdsource information which may include interactions of other users with the user interface. Although selectable portion 315 is depicted in FIG. 3H as being a portion of a menu screen, other portions of media content may be used for the selectable portion 315 including, but not limited to, different portions of the menu screen such as selectable options and search results.

Figure 3I:
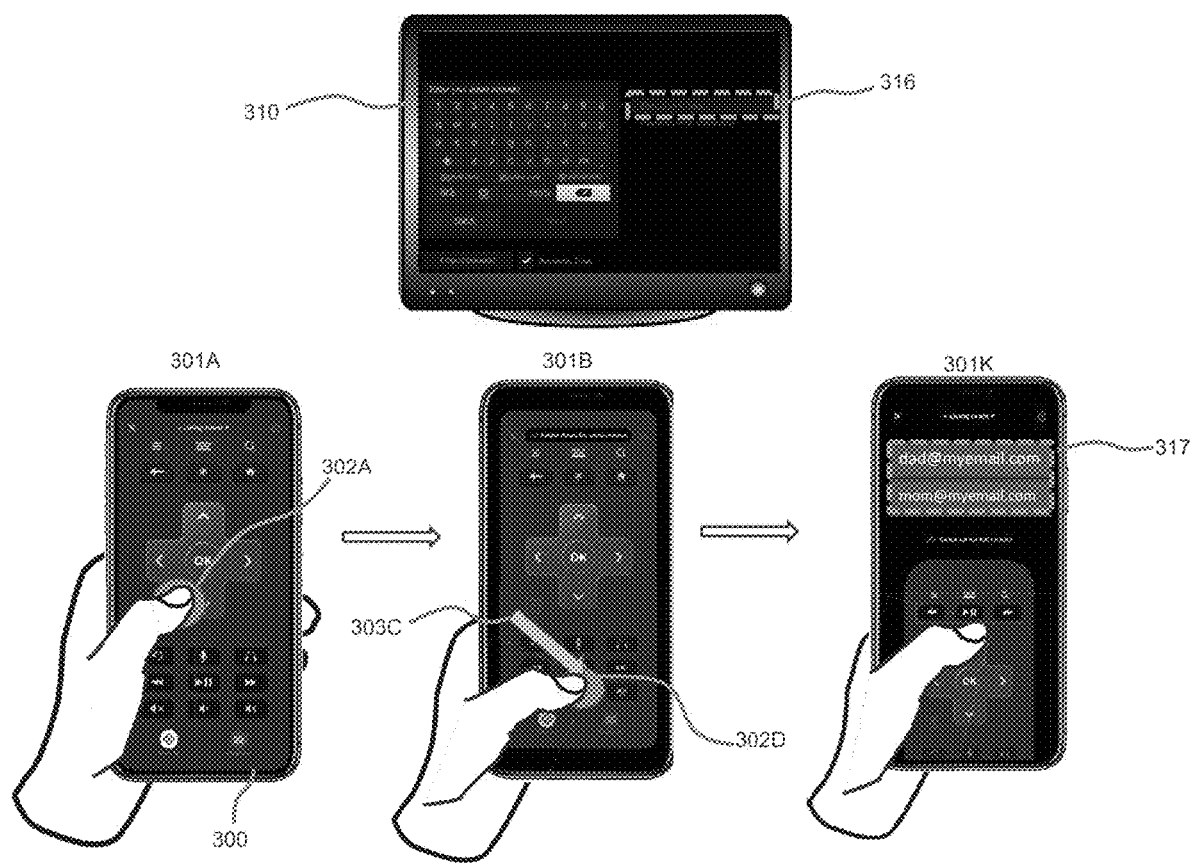

FIG. 3I depicts another flow involving an exemplary user interface shown at different configurations 301A, 301B and 301J. In this embodiment, remote control 300 is in communication with display device 310 that is displaying a menu that includes media content represented by selectable icons on the user interface. In an embodiment, the media content may be any combination of streaming applications, media content such as movies or television shows, and menus (e.g., for accessing settings). Initial configuration 301A and transition configuration 301B may be implemented similarly as discussed with respect to FIG. 3F which includes a user input with a diagonal motion 303C.

Final configuration 301K may include a display window 307 for displaying a list of predefined user inputs 317 based on the media content that is displayed on display device 310. Display window 307 may allow the user to view and quickly select a predefined user input from the list of predefined user inputs 317 on remote control 300 which may make it easier for the user to input information requested by media content. For example, display device 310 may display media content in the form of an input box 316 (e.g., an email address box for signing in to an account for a streaming application). Rather than having to use the direction pad to select each letter icon for the input (e.g., the email address), the user may select a predefined user input from the list of user inputs 317 which would then automatically populate the input box 316.

As described above, FIGS. 3A-3I depict various customizations of user interfaces on remote control 300 based on user inputs. The various customizations are merely illustrative. It is to be appreciated that different customizations may be combined together in an embodiment and associated with different user inputs other than those described above. Further, some of the customizations and user inputs may be combine in a different ways than shown in FIGS. 3A-3H, as will be understood by a person of ordinary skill in the art. The types of customizations may be determined based on the interface customization parameter which is generated based on any combination of the user's previous interactions, user-selectable settings, and/or crowdsource information which may include interactions of other users with the user interface.

Figure 4A:
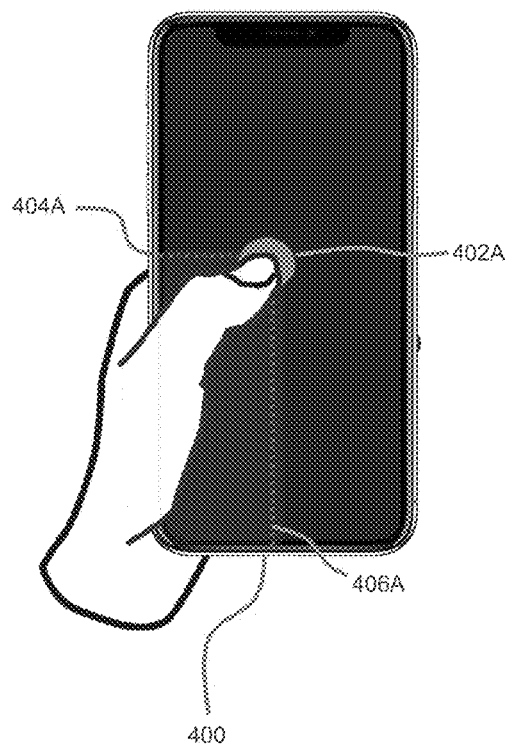
FIGS. 4A-4D illustrate exemplary diagrams illustrating different flows for customizing a user interface based on biometric information.

FIGS. 4A-4D are exemplary diagrams illustrating different flows for customizing a user interface based on biometric information. FIG. 4A depicts a diagram for measuring how far a user can reach with his finger (e.g., thumb) which can be correlated to a hand size or finger length of the user. In an embodiment, the remote control application initiate a screen to receive biometric information from the user. The screen may prompt a user to touch a portion of the screen with a finger (e.g., thumb) as part of receiving biometrics of the user. The remote control application may measure the hand size, finger length, finger pressure, and/or finger placement based on the user touch 402A. In an embodiment, the measurement may be relative to the size of remote control 400. For example, the remote control application may determine the position of user touch 402A based on the horizontal position 404A and vertical position 406A on the touchscreen of the remote control 400.

The remote control application may calculate the hand size or finger length of the user based on the horizontal position 404A and vertical position 406A. There may be a direct relationship between the length of the horizontal position 404A and vertical position 406A and the hand size or finger length. For example, a large horizontal position 404A and vertical position 406A may correspond to a large hand size (or longer finger length).

Based on the calculated finger or hand size, the remote control application may determine a scaling factor for reducing the size of the user interface. The scaling factor may be included as part of the interface customization parameter. Calculation of the interface customization parameter may be based on a mathematical relationship between any number of factors including the calculated finger or hand size, the screen size of the remote control 400, and any other user information available to the remote control application. The interface customization parameter may also include information associated with user biometric information such as the gender of the user, other user information such as usage information, or crowdsourced user interface information.

An example of how the user gender may influence the customization of the user interface includes a preset scaling factor or predetermined size for the customized user interface based on whether the user is a man or a woman. For example, the preset scaling factor or predetermined size of the customized user interface may be larger if the user is determined to be a man or a woman.

An example of how crowdsourced user interface information may influence the customization of the user interface includes using an average hand size of users that most closely match the user of remote control 400 to determine the appropriate scaling factor for reducing the user interface. For example, the remote control application may provide information about the user to a crowdsource server and the crowdsource server may identify, based on the provided information, a present scaling factor of similar users. Examples of information that may be provided to the crowdsource server for this purpose include one or more of the horizontal position 404A and vertical position 406A, the calculated hand size, the calculated finger length, a gender of the user, and monitored interactions with the user interface (e.g., button presses).

In an embodiment, there is an inverse relationship between the calculated hand size or the finger length and the scaling factor. For example, the larger the calculated hand size, the smaller the scaling factor which would result in a lesser reduction in the size of the user interface. Similarly, the smaller the calculated hand size, the larger the scaling factor which would result in a greater reduction in the size of the user interface.

In an embodiment, the remote control application may be further configured to store preset scaling factors that are defined based on the calculated hand size (from the horizontal position 404A and vertical position 406A). For example, the remote control application may store a table that define the relationship between a calculated hand size and a scaling factor. The specific measurements of the horizontal position 404A and vertical position 406A may fall within a predefined range within the table that corresponds to the scaling factor to be used for reducing the user interface.

In an embodiment, the remote control application may also calculate the finger pressure based on the user touch 402A. The touchscreen may have capacitive sensing capabilities. Based on fluid displacement or other capacitance changes detected by hardware in the remote control 400, may be able to determine or estimate a finger size or finger pressure of the user. This information may also be used to determine the scaling factor for reducing the size of the user interface.

Figure 4B:
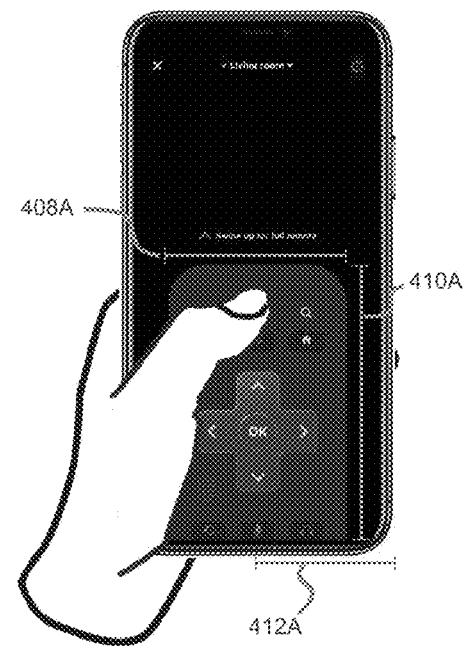

FIG. 4B depicts a customized user interface with a scaled horizontal dimension 408A and a scaled vertical dimension 410A, and a center position 412A. The scaled horizontal dimension 408A and the scaled vertical dimension 410A may be calculated based on scaling factor that was identified based on the calculated hand size. An exemplary method for calculating the hand size was discussed with respect to FIG. 4A. Scaled horizontal dimension 408A may be calculated by applying the scaling factor to the original horizontal dimension of the user interface; similarly, scaled vertical dimension 410A may be calculated by applying the scaling factor to the original vertical dimension of the user interface.

Center position 412A may represent where to position the customized user interface. In an embodiment, center position 412A represents a distance between the center of the customized user interface and the edge of the touchscreen. The physical dimensions of remote control 400 may be available to the remote control application. Examples of different screen sizes are shown below.

|  | Device 1 | Device 2 | Device 3 |
|---|---|---|---|
| Display size | 5.4-inch screen | 6.1-inch screen | 6.7-inch screen |
| Dimensions (inches) | 5.18 × 2.53 × 0.29 in. | 5.78 × 2.82 × 0.29 in. | 6.33 × 3.07 × 0.29 in. |

The physical dimensions may be utilized in calculating the interface customization parameter by, for example, calculating where to place the customized user interface on the display of the remote control 400. Like the scaled horizontal dimension 408A and the scaled vertical dimension 410A, the center position 412A may also be calculated based on the interface customization parameter which may include the scaling factor, other user biometric information such as the gender of the user, other user information such as usage information, or crowdsourced user interface information, as discussed above.

Figure 4C:
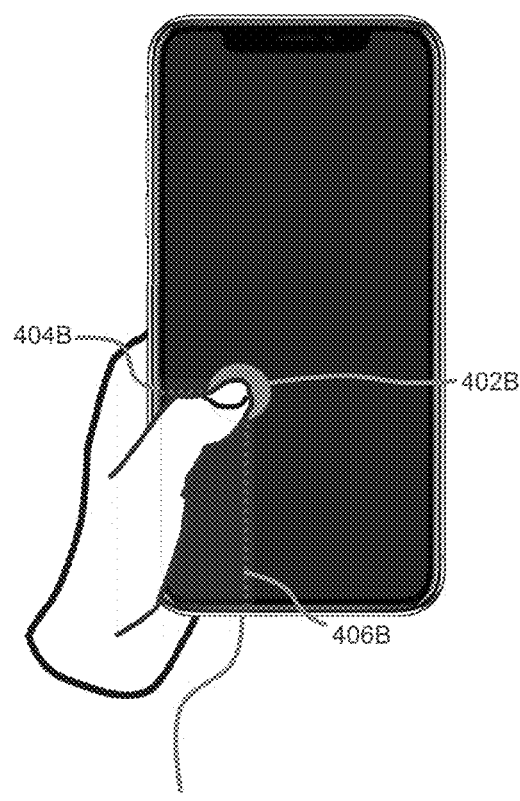

FIG. 4C depicts a diagram for measuring a hand or finger size of another user. Similar to the embodiment described with respect to FIG. 4A, the screen may prompt a user to touch a portion of the screen with a finger (e.g., thumb) as part of receiving biometrics of the user. The remote control application may measure the hand size, finger length, finger pressure, and/or finger placement based on the user touch 402B. The remote control application may determine the position of user touch 402B based on the horizontal position 404B and vertical position 406B on the touchscreen of the remote control 400.

Horizontal position 404B may be different than horizontal position 404A and vertical position 406B may be different than vertical position 406A. In an embodiment, horizontal position 404B is less than horizontal position 404A and vertical position 406B is less than vertical position 406A. In this embodiment, the calculated hand size of the user is smaller than the calculated hand size of the user in FIG. 4A. Customized user interface may need to be smaller for users with smaller hands. In an embodiment, this would require a larger scaling factor to reduce the user interface. In at least one embodiment, the hand size, finger size, or other biometric characteristics associated with the user (e.g., finger mobility, hand mobility, dominant hand, dominant finger) can be measured through the interaction with a device. In at least one embodiment, the characteristics associated with the user are collected without the prompt for a specific set of steps (e.g., touch here).

Figure 4D:
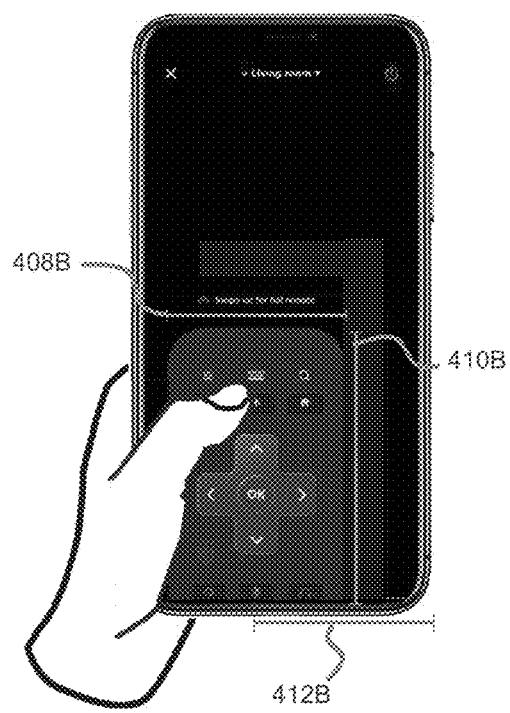

FIG. 4D depicts a customized user interface with a scaled horizontal dimension 408B and a scaled vertical dimension 410B, and a center position 412B. Because in this embodiment, horizontal position 404B is less than horizontal position 404A and vertical position 406B is less than vertical position 406A, scaled horizontal dimension 408B is also less then scaled horizontal dimension 408A and scaled vertical dimension 410B is less than scaled vertical dimension 410A.

Center position 412B may be larger than center position 412A which would result in the customized user interface being positioned closer to the left side of the touchscreen. This positioning would allow a user with smaller hands easier access to the user interface elements of the customized user interface.

Figure 5:
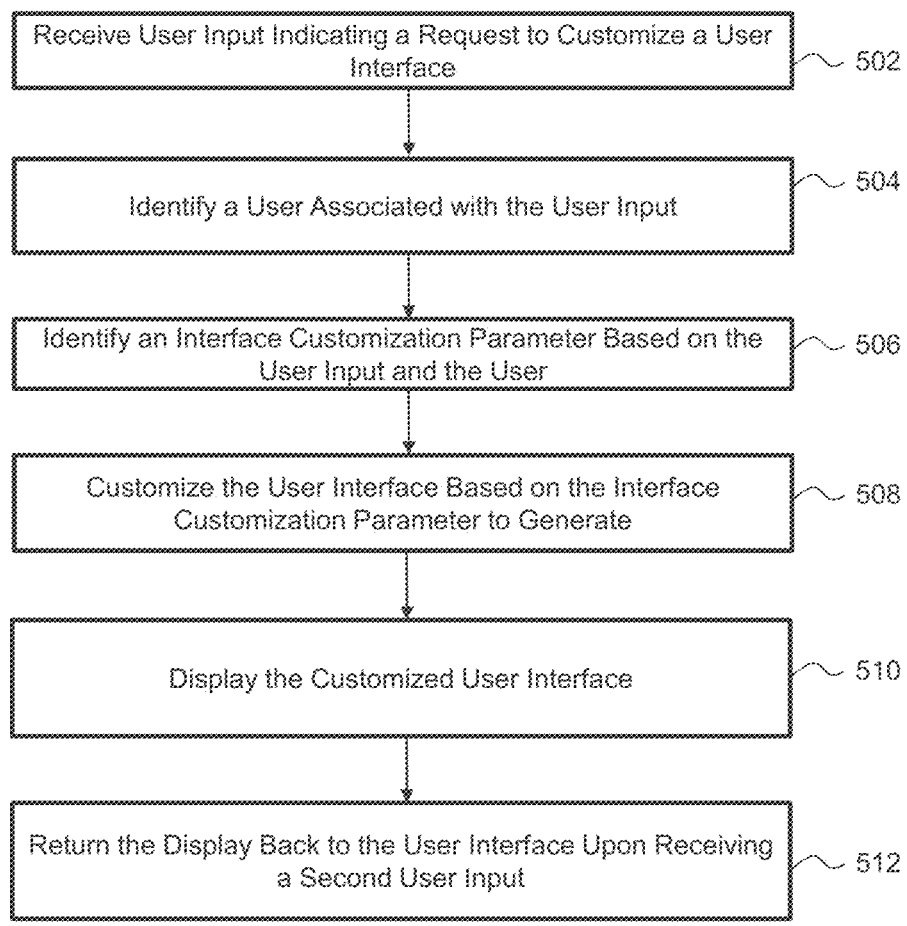
FIG. 5 is a flowchart illustrating a process for customizing a user interface based on an interface customization parameter, according to some embodiments.

FIG. 5 is a flowchart for a method 500 for customizing a user interface upon being triggered by a user input (e.g., user's actions such as use of remote control 101) and based on an interface customization parameter, according to some embodiments. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4, and in particular the remote control 110 and remote control application 116. However, method 500 is not limited to those example embodiments.

In 502, the remote control application 116 may receive user input indicating a request to customize a user interface. In an embodiment, the user input may be received when the user interface is in a first configuration. The request may include customizing the user interface from the first configuration to a second configuration. The user interface may have a first dimension while in the first configuration and may have a second dimension while in the first configuration. The dimensions may refer to a height and width of the user interface when it is displayed on the touchscreen. In an embodiment, the user input is a touch-based gesture received on a touchscreen of the remote control.

In 504, the remote control application 116 may identify a user associated with the user input. In an embodiment, this may involve identifying the user associated with the remote control 110, such as the user that has logged into remote control 110 using biometric means (e.g., fingerprint, facial recognition).

In 506, the remote control application 116 may identify an interface customization parameter responsive to receiving the user input and identifying the user. In an embodiment, the interface customization parameter is calculated based on a biometric data associated with the user.

In 508, the remote control application 116 may customize the user interface from the first configuration to a second configuration based on the interface customization parameter. The second configuration may be defined by a second dimension of the user interface. In an embodiment, the second dimension of the user interface is reduced in proportion to the first configuration. The first and second dimensions may be represented by a height and a width and define how user interfaces are displayed on remote control 110.

In addition to a reduction in the size of the dimension of the user interface, other customizations of the user interface may include changes in the placement of user interface elements such as rows of buttons, specific buttons or the addition of a new user interface element such as a display window which may be used to mirror media content displayed on a display device or provide access to shortcuts to options that are associated with the media content displayed on the display device.

In 510, the remote control application 116 displays the customized user interface on the touchscreen.

In 512, the remote control application 116 returns the customized user interface back to the first configuration of the user interface upon receiving a second user input. The second user input may be another gesture or require a touch on a specific portion of the screen.

Figure 6:
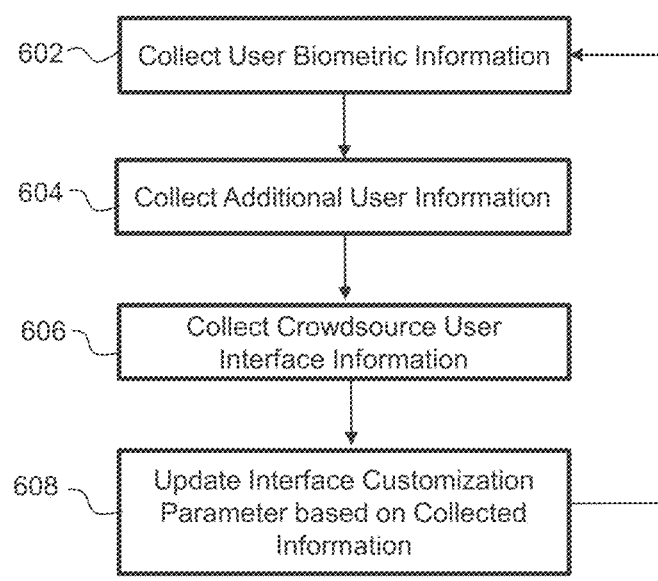
FIG. 6 is a flowchart illustrating a process for collecting user information for customizing a user interface, according to some embodiments.

FIG. 6 is a flowchart for a method 600 for updating an interface customization parameter, according to some embodiments. Method 600 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. For example, not all steps 602-606 may need to be performed in order to generate the interface customization parameter in 608. Method 600 shall be described with reference to FIGS. 1-4, and specifically remote control 110 and remote control application 116. However, method 600 is not limited to those example embodiments.

In 602, remote control application 116 may collect user biometric information. The user biometric information may include physical characteristics of the user, the sex of the user, and facial information associated with the user. Examples of physical characteristics include, but are not limited to, the size of the user's hand and the length of the user's fingers. In an embodiment, remote control application 116 may collect the user biometric information, such as in the manner described with respect to FIGS. 4A-4D. In another embodiment, remote control application 116 may retrieve the user biometric information from a secure storage location on the remote control application 116.

In 604, remote control application 116 may collect additional user information. This additional user information may include user interaction history and settings or options specifically set by the user. The user interaction history may include interactions between the user and the remote control application 116. Interaction history may include type of interaction (e.g., gesture, input) and the screen on which the user interacted (e.g., a menu screen, a search screen, a media content selection screen, a user input screen, streaming application). Interaction history may link the specific interactions with the specific screen on which the interactions occurred. For example, interaction history may record user interactions while a media content selection screen is displayed. In this manner, user interactions may be organized or filtered based on the particular screen or interface on which those interactions occurred. One benefit of this method of organizing the user interactions allows remote control application 116 to more accurately customize specific user interfaces depending on the type of screen that is being displayed to the user.

Regarding settings or options, remote control application 116 may provide settings associated with the different customizations and user inputs and the user may manually establish customizations of the user interface and manually link these customizations to a corresponding user input. Remote control application 116 may provide display one or more screens either on remote control 300 or on display device 310 that allow the user to set these interface settings. In an embodiment, the additional user information may override customizations generated by remote control application 116. For example, remote control application 116 may automatically generate a customization based on the user's biometric information and crowdsource information. As one example, the customization may be to scale the size of the user interface by a particular amount. If the user has manually set a setting to scale the size of the user interface by a different amount, remote control application 116 may utilize the setting manually set by the user.

In 606, remote control application 116 may collect crowdsource user interface information (e.g., from crowdsource server 128). Crowdsource user interface information may include other user interactions of remote control application 116 that is installed on their respective remote control devices. In an embodiment, crowdsource user interface information includes interaction histories for each of the user. Each of the interaction histories may also be organized based on the type of screens on which interactions occurred. For example, if display device 310 is displaying a menu screen associated with a particular streaming application, remote control application 116 may retrieve (or filter) interaction histories from other users to determine interactions for that particular menu screen. In this manner, remote control application 116 may apply the most relevant user interactions (both from the user as discussed in 604 and from other users based on crowdsource information) for customizing the user interface.

In 608, based on the collected information in 602-606, remote control application 116 may generate or update an interface customization parameter that is used to determine how to customize the user interface provided by remote control application 116 for the particular user. The interface customization parameter may be generated or updated based on any combination of information collected in 602-606. Updating of the interface customization parameter is an iterative and continuous process as new interaction information is collected by remote control application 116.

Figure 7:
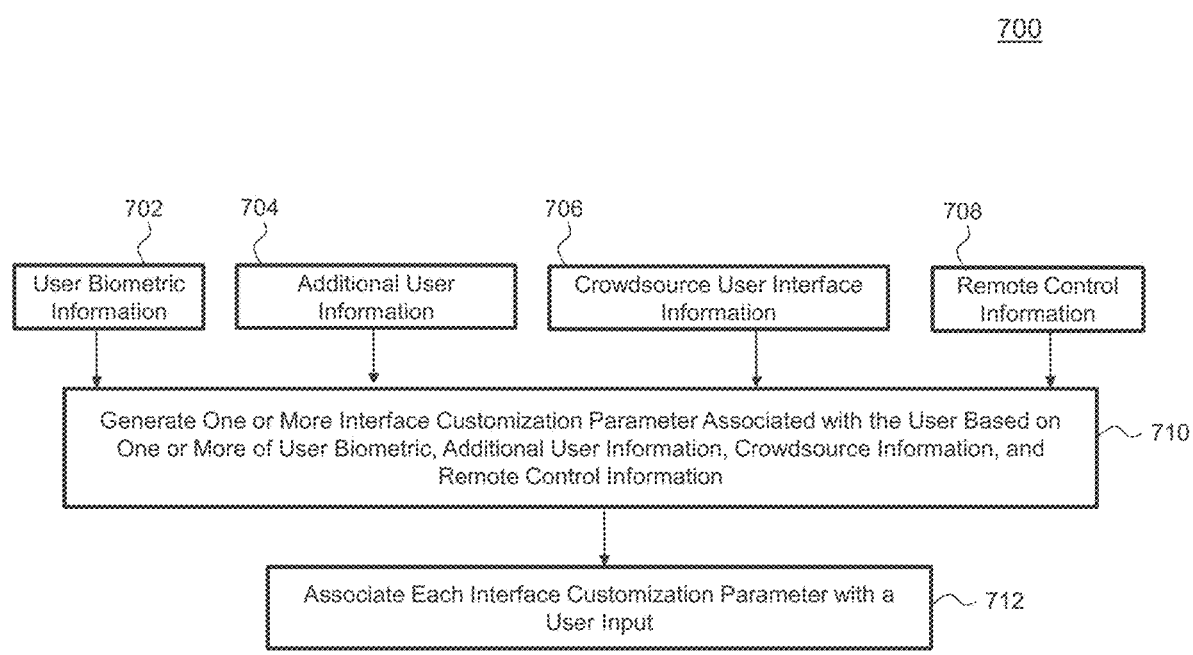
FIG. 7 is a flowchart illustrating a process for generating an interface customization parameter, according to some embodiments.

FIG. 7 is a flowchart for a method 700 for generating an interface customization parameter, according to some embodiments. Method 700 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. For example, not all steps 702-708 may need to be performed in order to generate the interface customization parameter in 710. Method 700 shall be described with reference to FIGS. 1-4, and specifically remote control 110 and remote control application 116. However, method 700 is not limited to those example embodiments.

In 702, the remote control application 116 may retrieve user biometric information associated with the user of the remote control 110. As noted above, user biometric information may be retrieved from sensors of remote control 110 such as a face or finger scanner or microphone 112. Biometric information may include, for example, the measured hand size, finger length, finger pressure, fingerprint, facial features, and voice data.

In 704, the remote control application 116 may retrieve additional user information associated with the user of the remote control. This additional user information may include specific user settings selected by the user. For example, the remote control application 116 may provide the user settings for selecting the user interface elements that are to be included as part of the customized user interface 304. The user may indicate, for example, that the display window 307 should always be part of the customized user interface 304 or may indicate preferred buttons to be made accessible within the customized user interface 304.

In 706, the remote control application 116 may retrieve crowdsourced user interface information that is associated with other users using the user interface provided by the remote control application 116 on their respective remote control 110. In an embodiment, crowdsource server 128 may store information about different user interface layouts and organize the different layouts based on different characteristics of the users including, by gender, by hand size, and by age, just to name a few examples. Crowdsource server 128 may receive the user biometric information from respective remote controls 110. The user interface layouts may include information about which user interface elements were most selected, the dimensions of the user interfaces, the positions of the user interface elements within their respective user interfaces.

In 708, the remote control application 116 may retrieve remote control information associated with the remote control 110 on which the remote control application 116 is installed. Examples of remote control information include the dimensions of the remote control, dimensions of the display screen of the remote control, and the type of device.

In 710, the remote control application 116 may generate one or more interface customization parameters based on one or more of the information retrieved in 602-608. The remote control application 116 may generate multiple interface customization parameters for providing different customizations of the user interface. There may be an interface customization parameter for repositioning the most utilized buttons; another interface customization parameter for including a display window 307 in proximity to the customized user interface 304; another interface customization parameter for including other user interface elements into the customized interface.

Additional examples are discussed with respect to FIGS. 3A-3G. For example, an interface customization parameter, an example of which is discussed with respect to FIG. 3B, may generate a customized user interface 304 where a second row of buttons 306 is moved to a more accessible location of the customized user interface 304; another interface customization parameter, an example of which is discussed with respect to FIG. 3E, may generate a customized user interface 304 where a third row of buttons 308 is moved to a more accessible location; and another interface customization parameter, an example of which is discussed with respect to FIG. 3F, may generate a customized user interface 3054 with volume down button 309A, volume up button 309B, and home button 309C, moved to a more accessible location of customized user interface 304.

A non-limiting example of an interface customization parameter is depicted below.

| User Interface Settings | Value | Position |
|---|---|---|
| Height | X | N/A |
| Width | Y | N/A |
| User Interface Elements | Button 1 | [$x_1$, $y_1$] |
| | Button 2 | [$x_2$, $y_2$] |
| | Display Window | [$x_3$, $y_3$] |
| Center Position | N/A | [$x_4$, $y_4$] |

In an embodiment, the information provided by an interface customization parameter may affect the dimensions and/or layout of user interface elements in the customized user interface. In the example above, the interface customization parameter specifies the specific height (e.g., X) and width (e.g., Y) of the user interface, particular user interface elements (Button 1, Button 2, a Display Window) to be displayed at particular positions within the customized user interface 304, and a center position of the customized user interface 304. In this embodiment, the position is provided in the form of coordinates but other formats may be used to identify where to position the user interface elements and the user interface.

Information from one or more steps 702-708 may be used to generate the interface customization parameter. Biometric information may be used to provide customization of a user interface based on the specific biometrics associated with a user of the remote control 110. For example, the calculated hand size of the user may be used to determine the amount that a user interface is to be resize for the customization. As noted above, two examples for resizing the user interface include a scaling factor and a specific height/width value.

Additional user information may be used to provide customization of a user interface based on other information associated with the user of the remote control 110. For example, the user may provide default settings to be used for customizing the user interface. The user may establish global default settings that apply to all customizations of the user interface or specific default settings that apply to specific customizations. For example, the user may input a setting that the display window 307 be displayed in all customizations (e.g., a global setting) or in specific customizations where the fast forward or rewind buttons are repositioned as part of the customized user interface.

Crowdsourced user information may be used to provide customization of a user interface based on crowdsource information from other users using the user interface and provided by crowdsource server 128. For example, crowdsourced user information may include details regarding how the user interfaces have been customized for users having similar characteristics as the user of the remote control 110. These characteristics may include viewing history, gender, and biometrics such as hand size, and finger length. As one example, the crowdsourced user information may specify a specific scaling factor or specific dimensions (e.g., height/width combination) for users having similar hand sizes or finger lengths, the same gender, and/or similar viewing histories. In another example, the crowdsourced user information may specify more popular user interface elements or button layouts for users having similar hand sizes or finger lengths, the same gender, and/or similar viewing histories.

Remote control information may be used to provide customization of a user interface based on characteristics of the remote control. For example, remote control information may include information about the physical dimensions of the remote control 110. The physical dimensions of the remote control 110 may be used to determine the appropriate size and position of the customized user interface 304. For example, center position 412A and center position 412B may be determined based on the width of the touchscreen of remote control 400.

In 712, the remote control application 116 associates the interface customization parameter with a specific user input. If there are more than one interface customization parameters (and therefore more than one user interface customizations), then each interface customization parameter may be associated with a different user input. In an embodiment, the user inputs are touch-based gestures input via a touchscreen of the remote control 110. Examples of different touch-based gestures were discussed with respect to FIGS. 3A-3G.

Example Computer System

Figure 8:
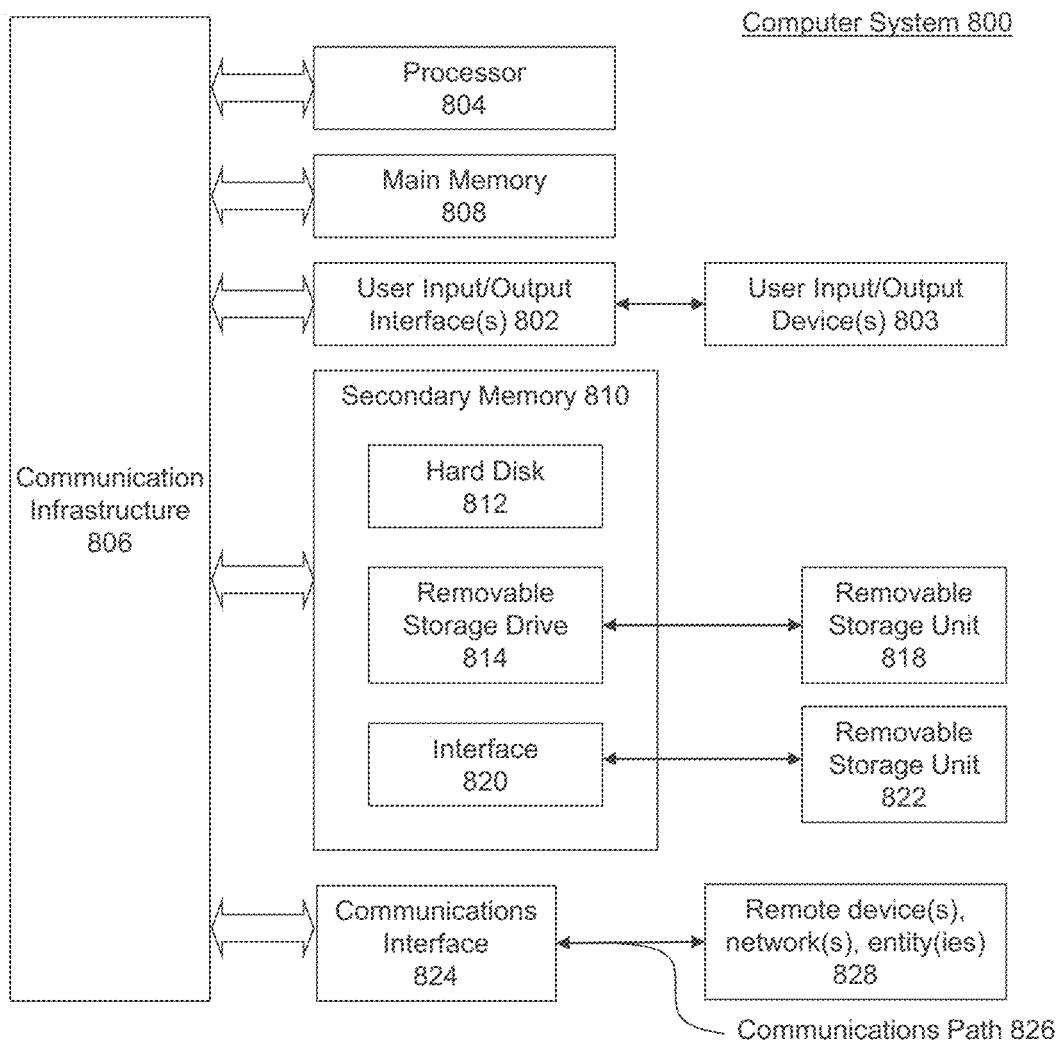
FIG. 8 illustrates an example computer system useful for implementing various embodiments.

Various embodiments may be implemented, for example, using one or more well-known computer systems, such as computer system 800 shown in FIG. 8. For example, the media device 106 may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for customizing a user interface for one-hand use on a remote control, comprising:
    receiving, when the user interface is in a first configuration, a user input associated with customizing the user interface, wherein the user interface comprises user interface elements, wherein the first configuration includes a first dimension of the user interface elements, and wherein the user input is a touch-based gesture received on a touchscreen of the remote control;
    identifying biometric information of a user associated with the user input, wherein the biometric information reflects a hand size of the user;
    transmitting, to a crowdsource server, the biometric information;
    receiving, from the crowdsource server, crowdsourced user interface information associated with the biometric information, wherein the crowdsourced user interface information includes usage information of the user interface collected by the crowdsource server from a plurality of remote controls, wherein the usage information includes a history of interactions with the user interface by the plurality of remote controls, and wherein an interface customization parameter is further calculated based on the crowdsourced user interface information;
    identifying the interface customization parameter responsive to receiving the user input and identifying the user, wherein the interface customization parameter is calculated based on the biometric information and the crowdsourced user interface information; and
    customizing, based on the interface customization parameter, the user interface from the first configuration to a second configuration, wherein the second configuration includes a second dimension of the user interface elements and a modified layout of the user interface elements, wherein the second dimension of the user interface elements is reduced in proportion to the first configuration by a scaling factor based on the biometric information of the user and the modified layout is generated based on the usage information included on the crowdsourced user interface information, wherein the remote control is in communication with a media device and a display device, and wherein the second configuration further includes an additional user interface element configured to mirror a second user interface of the display device, such that the second dimension of the user interface elements is displayed with the additional user interface element.

2. The method of claim 1, wherein the first configuration further includes a first position of the user interface elements within the user interface and the second configuration further includes a second position of the user interface elements within the user interface.

3. The method of claim 2, wherein the first dimension specifies a first height and a first width of the user interface and the second dimension specifies a second height and a second width of the user interface, and wherein the second dimension is generated by reducing the first dimension based on the interface customization parameter.

4. The method of claim 1, wherein the first configuration comprises first coordinates of the user interface specifying where to display the first configuration on the touchscreen of the remote control and the second configuration comprises second coordinates of the user interface specifying where to display the second configuration on the touchscreen of the remote control.

5. The method of claim 4, wherein the first coordinates of the user interface are modified based on the interface customization parameter to generate the second coordinates.

6. The method of claim 1, wherein the second configuration further comprises a content user interface element configured to mirror media content displayed by the media device on the display device.

7. The method of claim 1 wherein the interface customization parameter includes a reduction percentage based on the hand size of the user.

8. The method of claim 1, wherein the history of interactions includes a list identifying most selected buttons of the user interface on the plurality of remote controls, and wherein the user interface is displayed on the plurality of remote controls.

9. The method of claim 1, further comprising:
    monitoring, by the remote control, usage information of the user interface, wherein the usage information includes a history of interactions with the user interface by the user on the remote control, and wherein the interface customization parameter is further calculated based on the usage information.

10. The method of claim 9, wherein the history of interactions includes a ranked list identifying buttons on the user interface on the remote control, and wherein the ranked list ranks the buttons based on usage by the user.

11. The method of claim 10, wherein the ranked list identifies a button as most used by the user and wherein customizing, based on the interface customization parameter, the user interface from the first configuration to the second configuration further comprises:
    modifying a first button layout of the first configuration to a second button layout of the second configuration, wherein the first button layout includes a first position for a button of the user interface and the second button layout includes a second position for the button of the user interface, and wherein the second position is different from the first position.

12. A remote control comprising:
    a memory;
    a display configured to display a user interface; and
    at least one processor coupled to the memory and configured to perform operations comprising:
    receiving, when the user interface is in a first configuration, a user input associated with customizing the user interface for one-hand use, wherein the user interface comprises user interface elements, wherein the first configuration includes a first dimension of the user interface elements, and wherein the user input is a touch-based gesture received on the display;
    identifying biometric information of a user associated with the user input, wherein the biometric information reflects a hand size of the user;
    transmitting, to a crowdsource server, the biometric information;
    receiving, from the crowdsource server, crowdsourced user interface information associated with the biometric information;
    identifying an interface customization parameter responsive to receiving the user input and identifying the user, wherein the interface customization parameter is calculated based on the biometric information and the crowdsourced user interface information, wherein the crowdsourced user interface information includes usage information of the user interface collected by the crowdsource server from a plurality of remote controls, wherein the usage information includes a history of interactions with the user interface by the plurality of remote controls, and wherein the interface customization parameter is further calculated based on the crowdsourced user interface information; and customizing, based on the interface customization parameter, the user interface from the first configuration to a second configuration, wherein the second configuration includes a second dimension of the user interface elements and a modified layout of the user interface elements, wherein the second dimension of the user interface elements is reduced in proportion to the first configuration by a scaling factor based on the biometric information of the user and the modified layout is generated based on the usage information included on the crowdsourced user interface information, wherein the remote control is in communication with a media device and a display device, and the second configuration further includes an additional user interface element configured to mirror a second user interface of the display device, such that the second dimension of the user interface elements is displayed with the additional user interface element, wherein the additional user interface element further includes a selectable icon mirroring another selectable icon on the second user interface of the display device, and further wherein selection of the selectable icon of the additional user interface element causes a selection of the another selectable icon of the second user interface of the display device.

13. The remote control of claim 12, wherein the first configuration further includes a first position of the user interface elements within the user interface and the second configuration further includes a second position of the user interface elements within the user interface.

14. The remote control of claim 13, wherein the first dimension specifies a first height and a first width of the user interface and the second dimension specifies a second height and a second width of the user interface, and wherein the second dimension is generated by reducing the first dimension based on the interface customization parameter.

15. A non-transitory computer-readable medium having instructions stored thereon that, when executed by at least one computing device, cause the at least one computing device to perform operations comprising:

displaying a user interface on a touchscreen of the at least one computing device;

receiving, when the user interface is in a first configuration, a user input associated with customizing the user interface for one-hand use, wherein the user interface comprises user interface elements, wherein the first configuration includes a first dimension of the user interface elements, and wherein the user input is a touch-based gesture received on the touchscreen;

identifying biometric information of a user associated with the user input, wherein the biometric information reflects a hand size of the user;

transmitting, to a crowdsource server, the biometric information;

receiving, from the crowdsource server, crowdsourced user interface information associated with the biometric information, wherein the crowdsourced user interface information includes usage information of the user interface collected by the crowdsource server from a plurality of remote controls, wherein the usage information includes a history of interactions with the user interface by the plurality of remote controls, and wherein an interface customization parameter is further calculated based on the crowdsourced user interface information;

identifying the interface customization parameter responsive to receiving the user input and identifying the user, wherein the interface customization parameter is calculated based on the biometric information and the crowdsourced user interface information; and customizing, based on the interface customization parameter, the user interface from the first configuration to a second configuration, wherein the second configuration includes a second dimension of the user interface elements and a modified layout of the user interface elements, wherein the second dimension of the user interface elements is reduced in proportion to the first configuration by a scaling factor based on the biometric information of the user and the modified layout is generated based on the usage information included on the crowdsourced user interface information, wherein the remote control is in communication with a media device and a display device, and wherein the second configuration further includes an additional user interface element configured to mirror a second user interface of the display device, such that the second dimension of the user interface elements is displayed with the additional user interface element.

* * * * *